(12) United States Patent
Imai et al.

(10) Patent No.: US 8,363,104 B2
(45) Date of Patent: Jan. 29, 2013

(54) LANE DETERMINING DEVICE AND NAVIGATION SYSTEM

(75) Inventors: Masato Imai, Hitachinaka (JP); Masatoshi Hoshino, Tsuchiura (JP); Masao Sakata, Yokohama (JP)

(73) Assignee: Clarion Co., Ltd., Saitama-shi (JP)

( * ) Notice: Subject to any disclaimer, the term of this patent is extended or adjusted under 35 U.S.C. 154(b) by 146 days.

(21) Appl. No.: 13/055,603

(22) PCT Filed: Sep. 25, 2009

(86) PCT No.: PCT/JP2009/066639
§ 371 (c)(1),
(2), (4) Date: Jan. 24, 2011

(87) PCT Pub. No.: WO2010/035781
PCT Pub. Date: Jan. 4, 2010

(65) Prior Publication Data
US 2011/0169958 A1 Jul. 14, 2011

(30) Foreign Application Priority Data

Sep. 25, 2008 (JP) ................................. 2008-245111
Jun. 30, 2009 (JP) ................................. 2009-154533

(51) Int. Cl.
*H04N 7/18* (2006.01)
(52) U.S. Cl. ........................................ 348/149; 701/523
(58) Field of Classification Search ............... 701/300, 701/428, 431, 440, 441, 466, 523, 532, 533; 348/149
See application file for complete search history.

(56) References Cited

U.S. PATENT DOCUMENTS
6,577,334 B1 6/2003 Kawai et al.
2005/0169501 A1 8/2005 Fujii et al.
2006/0031008 A1 2/2006 Kimura et al.

FOREIGN PATENT DOCUMENTS
DE 101 17 237 A1 10/2001
EP 1 901 259 A1 3/2008
(Continued)

OTHER PUBLICATIONS

Corresponding International Search Report (Form PCT/ISA/210) with English translation, including Form PCT/ISA/237 (Nine (9) pages), (Dec. 15, 2009).

(Continued)

*Primary Examiner* — Mehrdad Dastouri
*Assistant Examiner* — Kristin Dobbs
(74) *Attorney, Agent, or Firm* — Crowell & Moring LLP

(57) ABSTRACT

Provided is a lane determining device that is capable of quickly and accurately determining the lane traveled by a host vehicle traveling on a road with a plurality of lanes in each direction. A lane determining device that determines the lane traveled by the host vehicle traveling on a road with a plurality of lanes in each direction comprises: road geometry obtaining means that obtains road geometry; imaging means that images the road; division line recognition means that recognizes a division line from an image imaged by the imaging means; first path computation means that computes a path of the host vehicle by repeatedly computing a distance from the division line recognized by the division line recognition means to the imaging means; second path computation means that computes a path of the host vehicle based on the road geometry obtained by the road geometry obtaining means and on autonomous navigation; third path computation means that computes a path of the host vehicle based on a first path computed by the first path computation means and on a second path computed by the second path computation means; and traveled lane determination means that determines the lane traveled by the host vehicle based on a third path computed by the third path computation means.

14 Claims, 11 Drawing Sheets

FOREIGN PATENT DOCUMENTS

| | | |
|---|---|---|
| EP | 1 908 664 A2 | 4/2008 |
| JP | 11-211492 A | 8/1999 |
| JP | 2000-105898 A | 4/2000 |
| JP | 2002-8199 A | 1/2002 |
| JP | 2006-23278 A | 1/2006 |
| JP | 2006-151123 A | 6/2006 |
| JP | 2007-178270 A | 7/2007 |
| JP | 2007-178271 A | 7/2007 |
| JP | 2007-278813 A | 10/2007 |
| JP | 2010-78387 | 4/2010 |

OTHER PUBLICATIONS

Supplementary European Search Report dated Mar. 22, 2012 (three (3) pages).

Enlarged view of the inside of square frame

Enlarged view of the inside of square frame

Enlarged view of the inside of square frame

Enlarged view of the inside of square frame (a)

(b)

LANE DETERMINING DEVICE AND NAVIGATION SYSTEM

TECHNICAL FIELD

The present invention relates to a lane determining device and navigation system that determines the lane a host vehicle is traveling in.

BACKGROUND ART

Navigation systems mounted in vehicles have the function of displaying, along with map information of its surroundings, a host vehicle position that is detected by such autonomous methods as a GPS (Global Positioning System), a gyro-system, etc.

Further, positional accuracy becomes higher the closer the host vehicle position displayed on the navigation system is to the actual host vehicle position. By outputting highly accurate host vehicle positions, passengers are able to obtain appropriate road information with respect to the actual host vehicle position, and it is possible to improve passenger comfort.

With conventional navigation systems, the estimation accuracy for the host vehicle position was low, and it was difficult to determine the lane the host vehicle is traveling in with respect to roads having a plurality of lanes with the same direction of traffic, that is, so-called roads with a plurality of lanes in each direction. As such, in giving directions for forks in highways, or in giving directions on which way to go at intersections, differentiated route guidance per lane could not be provided, and it was difficult to improve passenger comfort. In other words, in order to achieve advanced route guidance, it is necessary to accurately determine the lane the host vehicle is traveling in.

Now, there exists a vehicle-mounted navigation device that: determines a lane change by way of a winker operation signal and of a signal from a division line detection part (division-line crossing); determines the position of the lane that the host vehicle is traveling in; detects a fork ahead; and, based on the determined lane, gives directions regarding the fork to the driver at a position that precedes by a predetermined distance (see Patent Document 1). In addition, there exists a vehicle control device that determines the lane being traveled based on the kind (solid or dashed) of the division line (see Patent Document 2). Further, there exists a vehicle positioning device that measures the host vehicle position by extracting a white line from an image, computing the travel vector of the host vehicle based on the change in distance over a given period of time, and adding the travel vector (see Patent Document 3).

Patent Document 1: JP Patent Publication (Kokai) No. 2006-23278 A
Patent Document 2: JP Patent Publication (Kokai) No. 2000-105898 A
Patent Document 3: JP Patent Publication (Kokai) No. 2007-278813 A

DISCLOSURE OF THE INVENTION

Problems to be Solved by the Invention

With Patent Document 1, a lane change is determined by detecting both a winker operation and division line crossing. Consequently, there is a risk of losing track of the position of the lane that the host vehicle is traveling in as a result of forgetting to operate the winker or of failing to detect the crossing of a division line. In fact, in the case of roads with a plurality of lanes in each direction, division lines are often dashed lines, and losing sight of division lines during lane changes occurs frequently. As a result, failures to detect division line crossing occur.

In addition, with Patent Document 2, in order to recognize the kind of a division line (solid line, dashed line, dotted line, etc.), several strips of paint have to be detected, and there is a problem in that it takes time to determine a lane. In addition, faded paint could cause detection failures or erroneous detections. Further, since standards for division lines vary from country to country or region to region, this method would require specialized care per shipping destination, and is not necessarily practical.

Further, with Patent Document 3, when the angle formed between the division line and the travel direction of the vehicle is large, the accuracy of the distance to the division line as computed from the image drops. As a result, it is difficult to estimate the host vehicle position at the time of lane change. In addition, in the event of a lane change where the division line kind is dashed line or where the division line itself is faded and unrecognizable, it cannot be determined which lane it is present in even if a division line is subsequently recognized (because the continuity between the division lines before and after the lane change is unknown). Similarly, distinguishing between a lane change to the next lane, and consecutive lane changes across two or more lanes is also difficult.

As such, an object of the present invention lies in providing a lane determining device that is capable of quickly and accurately determining the lane traveled by a host vehicle traveling on a road with a plurality of lanes in each direction. Further, an object of the present invention lies in providing a lane determining device that determines the lane traveled by accurately computing an in-lane position even in cases where division lines are temporarily unrecognizable.

Means for Solving the Problems

In order to solve the problems above, one preferred embodiment of the present invention is as presented below.

A lane determining device that determines a lane traveled by a host vehicle traveling on a road with a plurality of lanes in each direction, the lane determining device comprising: imaging means that images the road; division line recognition means that recognizes a division line from an image imaged by the imaging means; first path computation means that computes a path of the host vehicle by repeatedly computing a distance from the division line recognized by the division line recognition means to the imaging means; second path computation means that computes a path of the host vehicle based on autonomous navigation; third path computation means that computes a path of the host vehicle based on a first path computed by the first path computation means and on a second path computed by the second path computation means; and traveled lane determination means that determines the lane traveled by the host vehicle based on a third path computed by the third path computation means, wherein the third path computation means computes the third path based on the first path if the division line recognition means was able to recognize a division line, and computes the third path based on the second path if the division line recognition means was unable to recognize a division line.

In addition, a lane determining device, which detects a division line provided on a road with a plurality of lanes in each direction and which determines a lane traveled by a host vehicle based on a relationship between the division line and the host vehicle and on a travel path of the host vehicle, determines the lane traveled based on the travel path and road geometry if the division line could not be detected.

Effects of the Invention

According to the present invention, it is possible to provide a lane determining device that is capable of quickly and accurately determining a lane traveled by a host vehicle traveling on a road with a plurality of lanes in each direction. Further, by using autonomous navigation that takes road geometry into account, it is possible to provide a lane determining device that is capable of accurately determining a lane traveled by the host vehicle even when changing lanes on a curved road such as a curve, etc.

The content disclosed in the specification and/or drawings of JP Patent Application No. 2008-245111 and the content disclosed in the specification and/or drawings of JP Patent Application No. 2009-154533, from both of which the present application claims priority, are incorporated into the present specification.

DESCRIPTION OF SYMBOLS

100 Lane determining device
300, 600, 700, 800, 900, 1000 Host vehicle
301, 601, 701, 801, 901, 1001 Travel path

BEST MODE FOR CARRYING OUT THE INVENTION

Embodiments are described in detail below with reference to the drawings.

Figure 1:
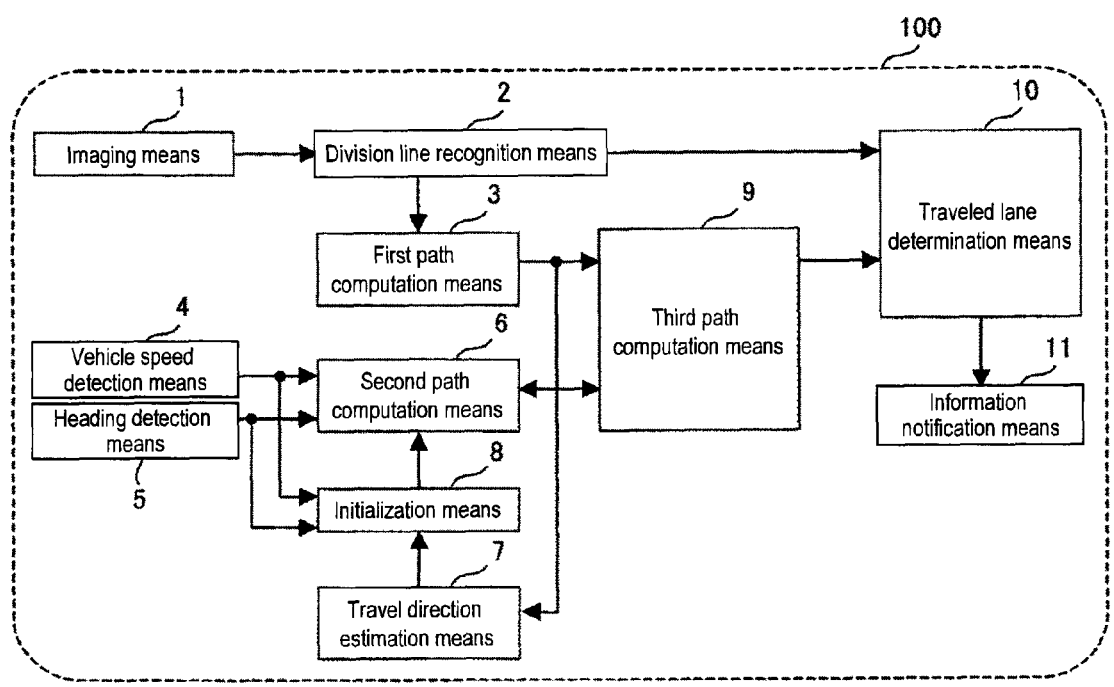
FIG. 1 is a block diagram of a lane determining device.

FIG. 1 is a block diagram showing the functions of a lane determining device.

First, the configuration and content of processing of a lane determining device 100 will be described.

The lane determining device 100 comprises: an imaging means 1; a division line recognition means 2; a first path computation means 3; a vehicle speed detection means 4; a heading detection means 5; a second path computation means 6; a travel direction estimation means 7; an initialization means 8; a third path computation means 9; a traveled lane determination means 10; and an information notification means 11. The lane determining device 100 is programmed into a computer, which is not shown in the diagram, of the lane determining device 100 and repeatedly executed with a predefined period.

The imaging means 1 obtains an image outside of the host vehicle by means of an imaging device such as a CCD (Charge Coupled Device) image sensor, etc., for which, for example, a camera may be used. Its imaging direction may be any of forward of the vehicle (front view camera), sideways of the vehicle (side view camera), rearward of the vehicle (rear view camera) and an oblique direction. It may also be an omnidirectional camera that images omnidirectionally. In addition, with respect to the kind of the camera, it may be a monocular camera that images with one camera, or a stereo camera that images with two cameras. With respect to how many are to be mounted, they may be disposed in each of the front, rear, left and right directions of the vehicle.

The division line recognition means 2 processes image information obtained by the imaging means 1 to recognize division lines within the image. Here, the term division line refers to a line provided by a road administrator and drawn on road surfaces with raised road markers, paint, stones, etc., and is a kind of road marking. Specific examples include road center lines and road boundary lines. In addition, it has functions of repeatedly computing the distance from the recognized division line to the imaging means and, further, of discerning the division line kind (solid line, dashed line, dotted line, etc.) (hereinafter referred to as line kind discernment).

The first path computation means 3 computes the travel path of the host vehicle based on the distance from the division line to the imaging means computed by the division line recognition means 2. The performance of the first path computation means is affected by the motion of the host vehicle, in addition to the state of the division line such as its presence/absence, fading, etc. When traveling straight, it is possible to accurately trace the travel path of the host vehicle within the lane. However, when the host vehicle turns to change lanes, etc., and the angle between the host vehicle and the division line or a change therein becomes large, the division line cannot be recognized and the path is interrupted. As a result, immediately following a lane change, it cannot be recognized which lane the host vehicle is traveling in.

The vehicle speed detection means 4 detects the vehicle speed of the host vehicle. By way of example, there may be employed a method in which vehicle speed is detected by averaging values obtained by wheel speed sensors that the left and right wheels on the front and rear are respectively equipped with, a method in which vehicle speed is computed by integrating acceleration values of the host vehicle obtained by an acceleration sensor that the host vehicle is equipped with, etc.

The heading detection means 5 detects the heading of the host vehicle. There may be employed a method in which the heading of the host vehicle is computed from values obtained by a gyrosensor or a yaw rate sensor, etc.

The second path computation means 6 computes the travel path of the host vehicle by way of autonomous navigation using the vehicle speed detected by the vehicle speed detection means 4 and the host vehicle heading detected by the heading detection means 5. Since the second path computation means traces a path based on the motion of the host vehicle using autonomous navigation, the path is never interrupted. However, since errors in vehicle speed and heading are accumulated over time, the period over which it can be used without correction is short. In addition, since heading and position are relative, initialization is important.

The travel direction estimation means 7 estimates the travel direction of the host vehicle based on the travel path of the host vehicle computed by the first path computation means 3.

Based on the travel direction of the host vehicle estimated by the travel direction estimation means 7, the vehicle speed detected by the vehicle speed detection means 4, and the host vehicle heading detected by the heading detection means 5, the initialization means 8 determines whether or not to initialize autonomous navigation, and initializes if the accuracy of the travel direction of the host vehicle estimated by the travel direction estimation means 7 is high.

The third path computation means 9 computes a final travel path of the host vehicle based on the first path computed by the first path computation means 3 and the second path computed by the second path computation means 6. Specifically, based on properties of the above-mentioned first and second path computation means, the first path is taken to be the final travel path of the host vehicle if the first path is valid (if a division line is recognized by the division line recognition means 2), and the final travel path of the host vehicle is obtained through extrapolation from the second path if the first path is invalid (if no division line is recognized by the division line recognition means 2). A continuous travel path is thus obtained regardless of the travel state of the host vehicle.

The traveled lane determination means 10 determines the lane the host vehicle is traveling in on a road with a plurality of lanes based on the final travel path of the host vehicle computed by the third path computation means 9.

The information notification means 11 performs a process of notifying passengers of information obtained from the traveled lane determination means 10 through audio or a monitor screen in a manner that is easy to understand. In addition, by changing the content to be notified to the passengers based on the lane the host vehicle is traveling in as obtained from the traveled lane determination means 10, it is possible to give accommodating directions that are easy to understand.

Next, the content of processing of the lane determining device as a whole will be described.

Figure 2:
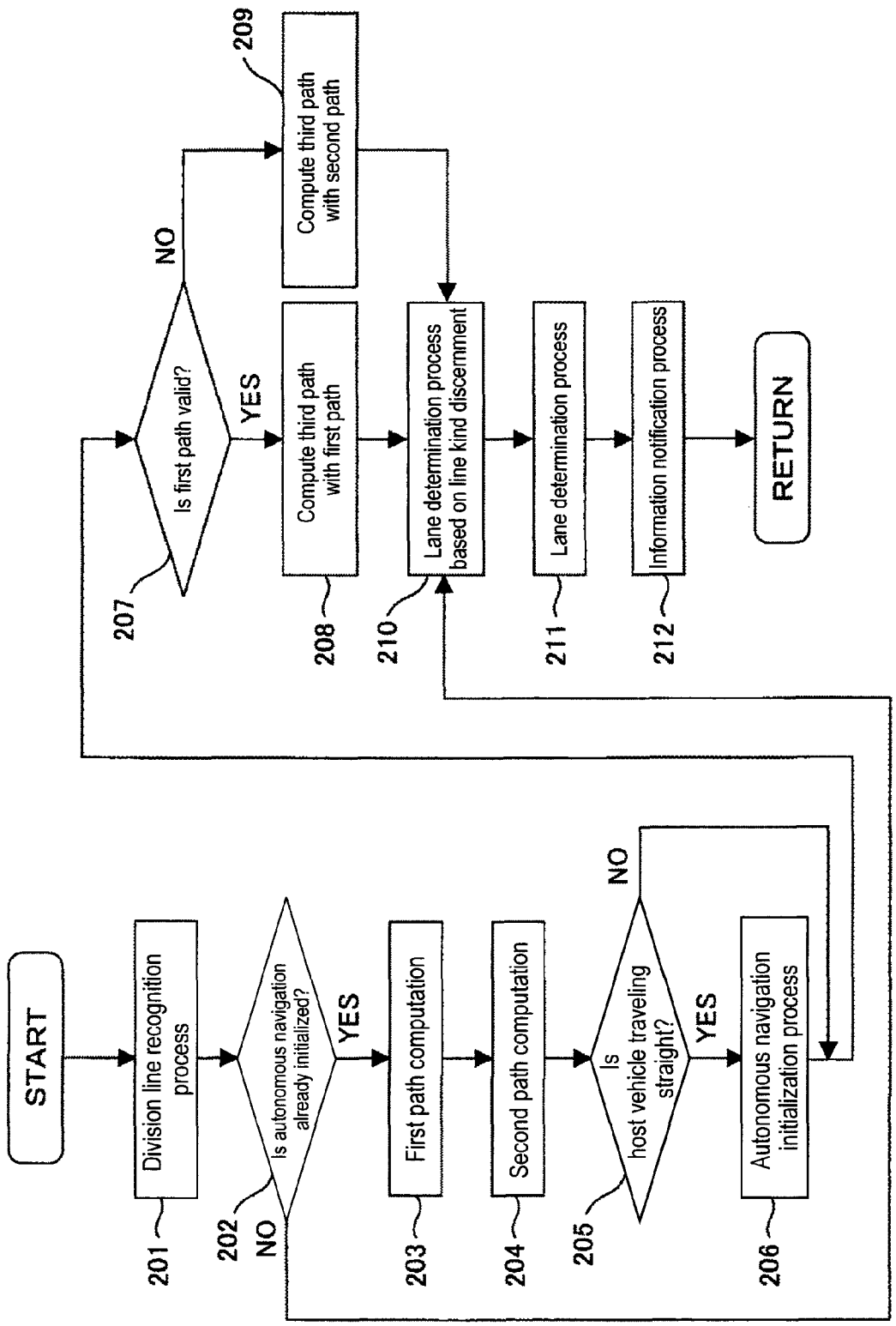
FIG. 2 is a flowchart showing the content of processing by a lane determining device.

FIG. 2 is a flowchart showing the content of processing of the lane determining device in the present embodiment.

First, in process 201 the distance from the division line recognized by the division line recognition means 2 to the imaging means is repeatedly computed and, further, the kind (solid line, dashed line, dotted line, etc.) of the division line is discerned.

Next, in process 202, it is determined whether or not autonomous navigation is already initialized. If autonomous navigation is already initialized, the flow proceeds to process 203. If autonomous navigation is not already initialized, the flow proceeds to process 210.

In process 203, a travel path (first path) of the host vehicle is computed based on the distance from the division line to the imaging means computed in process 201.

Next, in process 204, a travel path (second path) of the host vehicle is computed by autonomous navigation.

Next, in process 205, it is determined whether or not the host vehicle is traveling straight. If the host vehicle is traveling straight, the flow proceeds to process 206. If the host vehicle is not traveling straight, the flow proceeds to process 207. Here, the determination as to whether or not the host vehicle is traveling straight is performed under the condition that the angle difference between the travel direction of the host vehicle estimated by the travel direction estimation means 7 and the direction of the division line recognized by the division line recognition means 2 is within a predetermined angle (e.g., within 2 degrees) or the change in the angle difference is within a predetermined value (e.g., 1 degree/second), that the vehicle speed detected by the vehicle speed detection means 4 is equal to or greater than a predetermined speed (e.g., 10 km/h or greater), and that the rate of change in the host vehicle heading (angular speed) detected by the heading detection means 5 is within a predetermined range (e.g., within 0.2 deg/s).

In process 206, since the host vehicle is traveling straight and the estimation accuracies for heading and position are presumably high, autonomous navigation is initialized. With respect to the method of this initialization, the value of the first path is assigned for the horizontal position on the road (y in FIG. 3 described later), and the travel direction of the host vehicle estimated by the travel direction estimation means 7 is assigned for heading. Specifically, the travel path of the host vehicle is traced back by a predetermined period, and the gradient of a regression line based on the least squares method is taken to be the travel direction.

Next, in process 207, it is determined whether or not the first path is valid. If the first path is valid, the flow proceeds to process 208, and the first path is computed as the third path. On the other hand, if the first path is not valid, the flow proceeds to process 209, and the second path is computed as the third path. Here, the first path's being valid indicates a case where a division line is recognized by the division line recognition means 2, and the first path's not being valid indicates a case where a division line is not recognized by the division line recognition means 2.

Next, in process 210, a lane determination process based on line kind discernment is performed. Here, the lane the host vehicle is traveling in is determined using the kind (solid line, dashed line, dotted line, etc.) of the division line recognized by the division line recognition means 2. For example, in the case of a Japanese highway with three lanes in each direction, division line kinds would be arranged in the following order from the left: solid line; dashed line; dashed line; solid line. Accordingly, if the kind(s) of the division lines on both sides of the host vehicle can be recognized, the lane the host vehicle is traveling in is naturally determinable.

Next, in process 211, the lane the host vehicle is traveling in is determined using the third path computed in process 208 or process 209. Specifically, it need only be determined at which position the horizontal position of the third path lies on a road with a plurality of lanes, and this is determined using lane width information. It is noted that if the lane the host vehicle is traveling in has been determined through line kind discernment in process 210, the lane determined using the third path is not employed, and the lane determined through line kind discernment is employed with priority. In so doing, if the lane determined through line kind discernment differs from the lane determined based on the third path, the horizontal position of the third path is corrected to the lane position determined through line kind discernment. As discussed earlier, a predetermined distance needs to be traveled for line kind discernment and response is therefore slow, but reliability is high. On the other hand, if a long period of time elapses after the first path becomes invalid due to repeated meandering by the host vehicle, etc., errors in the second path based on autonomous navigation accumulate. Even if a division line were recognized thereafter, it would not be possible to trace the travel path with a method based on the distance from the distance from the division line to the imaging means since it cannot be identified which division line it is. Thus, as a back up for special driving conditions, the above-mentioned correction based on line kind discernment is used.

Finally, in process 212, based on information on the lane the host vehicle is traveling in found in process 211, road directions are changed, and information is notified to the passengers using audio or the screen.

As described above, according to the lane determining device 100 above, a division line provided on a road with a plurality of lanes in each direction is detected, and the lane the host vehicle is traveling in is determined based on a travel path of the host vehicle computed based on the relationship between this division line and the host vehicle and on autonomous navigation. Thus, the distance traveled before the lane traveled is determined can be shortened, and errors that accumulate in proportion to the distance traveled can be reduced. Therefore, it is possible to quickly and accurately determine the lane the host vehicle is traveling in.

Accordingly, in giving directions at a fork in a highway or in giving directions on which way to go at an intersection located ahead of the vehicle by way of a navigation system, for example, it is possible to perform differentiated route guidance per lane, and to improve passenger comfort by thus achieving advanced route guidance for passengers.

Next, with reference to FIG. 3, a specific example of a lane determination process of the lane determining device 100 will be described applying a certain road situation.

Figure 3:
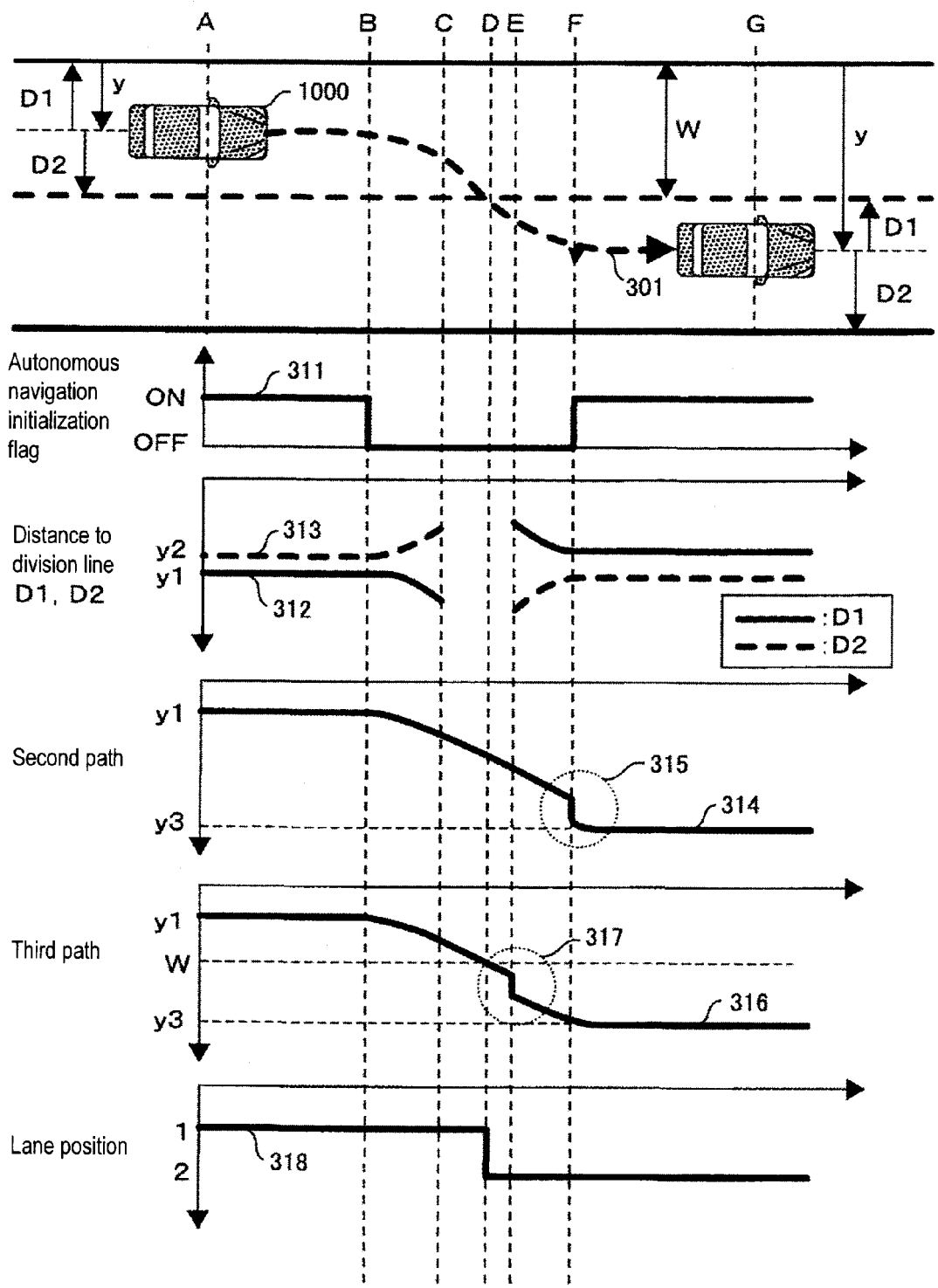
FIG. 3 is a diagram illustrating a specific example.

FIG. 3 is a diagram showing a case where a host vehicle 300 changes lanes from the left lane to the right lane following the path of dotted line arrow 301 on a road with two lanes in each direction.

In FIG. 3, D1 represents the distance from the center of the vehicle to the division line seen on the left, and D2 the distance from the center of the vehicle to the division line seen on the right. The division lines concerned vary depending on whether the host vehicle 300 is present in the left lane or the right lane. In addition, the distance from the leftmost division line to the host vehicle 300 is denoted y. Further, lane width is denoted W.

First, when the host vehicle 300 is present at spot A, it is determined that the host vehicle 300 is traveling straight (YES in process 205), and an autonomous navigation initialization process is performed (process 206). At this point, if both D1 and D2 are valid, by computing first path 312 with priority given to D1, for example, and setting the horizontal position for autonomous navigation to y1, and the heading to the heading found with first path 312, the path computed by autonomous navigation turns out to be like second path 314. Further, since the first path is valid (YES in process 207), the first path is substituted into the third path (process 208), and the lane the host vehicle is traveling in is determined (process 211). In this case, since y1<W, the lane the host vehicle is traveling in would be 1 (left lane) as indicated by lane position 318. In addition, since the host vehicle 300 will be determined to be traveling straight (autonomous navigation initialization flag 311 is ON) until the host vehicle 300 reaches spot B from spot A, the process thereafter is the same as in the case where it is at spot A.

Next, once the host vehicle 300 reaches spot B, since the host vehicle 300 has started a lane change operation, it will be determined to be not traveling straight (NO in process 205), and the autonomous navigation initialization flag becomes OFF. Then, although D1 and D2 respectively change until the host vehicle 300 reaches spot C, since the first path is valid (YES in process 207), the first path is substituted into the third path (process 208), and the lane the host vehicle is traveling in is determined (process 211). Thus, the first path and the third path are the same from spots A to C.

Next, once the host vehicle 300 reaches spot C, and D1 and D2 are lost (NO in process 207), the third path is extrapolated from the second path (process 209). Further, once the host vehicle 300 reaches spot D, since the horizontal position of the third path exceeds lane width W, lane position 318 that the host vehicle is traveling at changes to 2 (process 211).

Next, once the host vehicle 300 reaches spot E, and D1 and D2 become valid again (YES in process 207), since the third path is returned to the first path (process 208), if there are any errors in the second path, the third path jumps as in area 317.

Next, once the host vehicle 300 reaches spot F, the autonomous navigation initialization flag becomes ON again, and autonomous navigation is initialized (process 206). At this point, if there are any errors in the second path, the second path jumps as in area 315.

Thereafter, it is determined that the host vehicle 300 is traveling straight (autonomous navigation initialization flag 311 is ON) until the host vehicle 300 reaches spot G.

As described above, by combining the distance from the host vehicle to the division line with autonomous navigation, it becomes possible to trace an accurate travel path without any interruptions, and it is thus possible to quickly and accurately determine the lane the host vehicle is traveling in.

It is noted that although an example with respect to a road with two lanes in each direction was shown in FIG. 3, it goes without saying that it would still be applicable even if there are three or more lanes.

Thus, various embodiments are possible within a scope that does not depart from the spirit of the present invention.

Thus, since a division line provided on a road with a plurality of lanes in each direction is detected, and the lane the host vehicle is traveling in is determined based on a travel path of the host vehicle computed based on the relationship between the division line and the host vehicle and on autonomous navigation, the distance that needs to be traveled before the traveled lane is determined can be made shorter than that of the method in Patent Document 2, and errors that accumulate in proportion to the distance traveled can be reduced. Therefore, it is possible to quickly and accurately determine the lane the host vehicle is traveling in. Therefore, advanced route guidance by a navigation system becomes possible.

Next, another embodiment of the present invention is described in detail with reference to the drawings.

Figure 4:
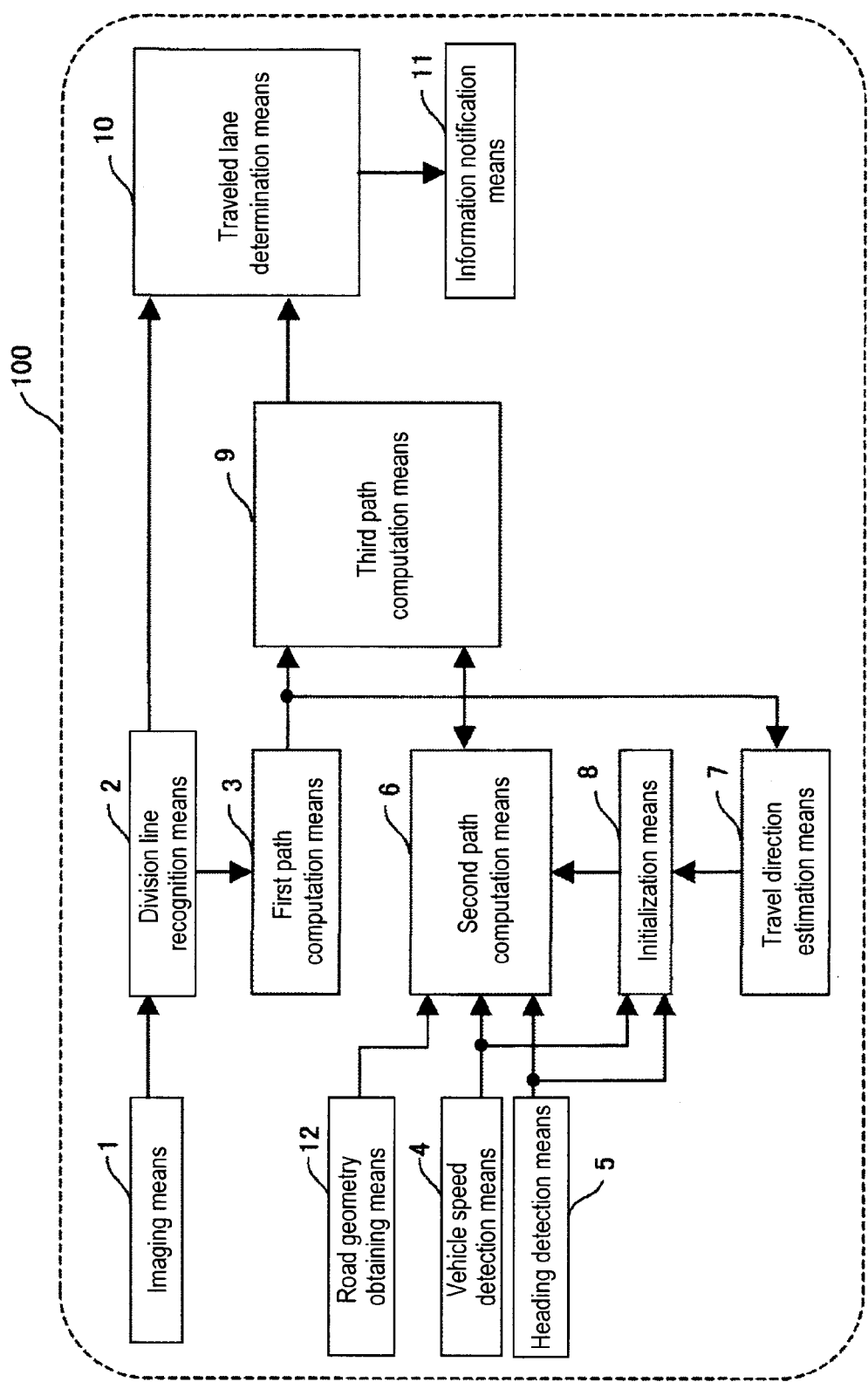
FIG. 4 is a block diagram of a lane determining device in another embodiment.

FIG. 4 is a block diagram showing functions of a lane determining device in another embodiment of the present invention, and is one in which a road geometry obtaining means 12 has been added to the lane determining device described with FIG. 1. As such, features and functions that differ from those of FIG. 1 will be described.

The road geometry obtaining means 12 detects the host vehicle position using signals outputted from a GPS (Global Positioning System: satellite navigation system) receiver mounted on the vehicle, etc., and obtains the road geometry of a road the host vehicle is traveling on from the detected host vehicle position and map information. The road geometry obtained here comprises such information as number of lanes, lane width, division line kinds per lane, radius of curvature of road, presence/absence of forks/junctions, etc., and it may be configured such that a two-dimensional geometry of a road is obtained or the three-dimensional geometry itself.

The second path computation means 6 computes a travel path of the host vehicle through autonomous navigation that uses the road geometry obtained by the road geometry obtaining means 12, the vehicle speed detected by the vehicle speed detection means 4, and the host vehicle heading detected by the heading detection means 5. Here, autonomous navigation refers to a method in which the vehicle position is sequentially calculated by adding a velocity vector of the vehicle, which is derived from vehicle speed and heading, to the initial position. Specifically, using host vehicle speed VSP and host vehicle heading change DIR, host vehicle position (X, Y) may be calculated through Equations (1) and (2).

[Equation 1]

$$X = Xz1 + VSP \times \Delta t \times \cos(DIR) \quad (1)$$

[Equation 2]

$$Y = Yz1 + VSP \times \Delta t \times \sin(DIR) \quad (2)$$

Here, (Xz1, Yz1) represent the previous calculation results for the host vehicle position, and $\Delta t$ the calculation period. Whereas a path computed by the first path computation means 3 is interrupted when a division line is unrecognizable, since the second path computation means 6 traces a path using autonomous navigation, the path is never interrupted. However, since errors in vehicle speed and heading accumulate over time, the period over which it can be used without correction is short. In addition, since heading and position are relative, initialization is important.

Based on the travel direction of the host vehicle estimated by the travel direction estimation means 7, the vehicle speed detected by the vehicle speed detection means 4, and the host vehicle heading detected by the heading detection means 5, the initialization means 8 determines whether or not to initialize autonomous navigation, and performs initialization if the accuracy of the travel direction of the host vehicle estimated by the travel direction estimation means 7 is high. In addition, autonomous navigation is also initialized if the division line recognition means 2 becomes unable to recognize a division line.

Next, the content of processing by the lane determining device in FIG. 4 as a whole will be described.

Figure 5:
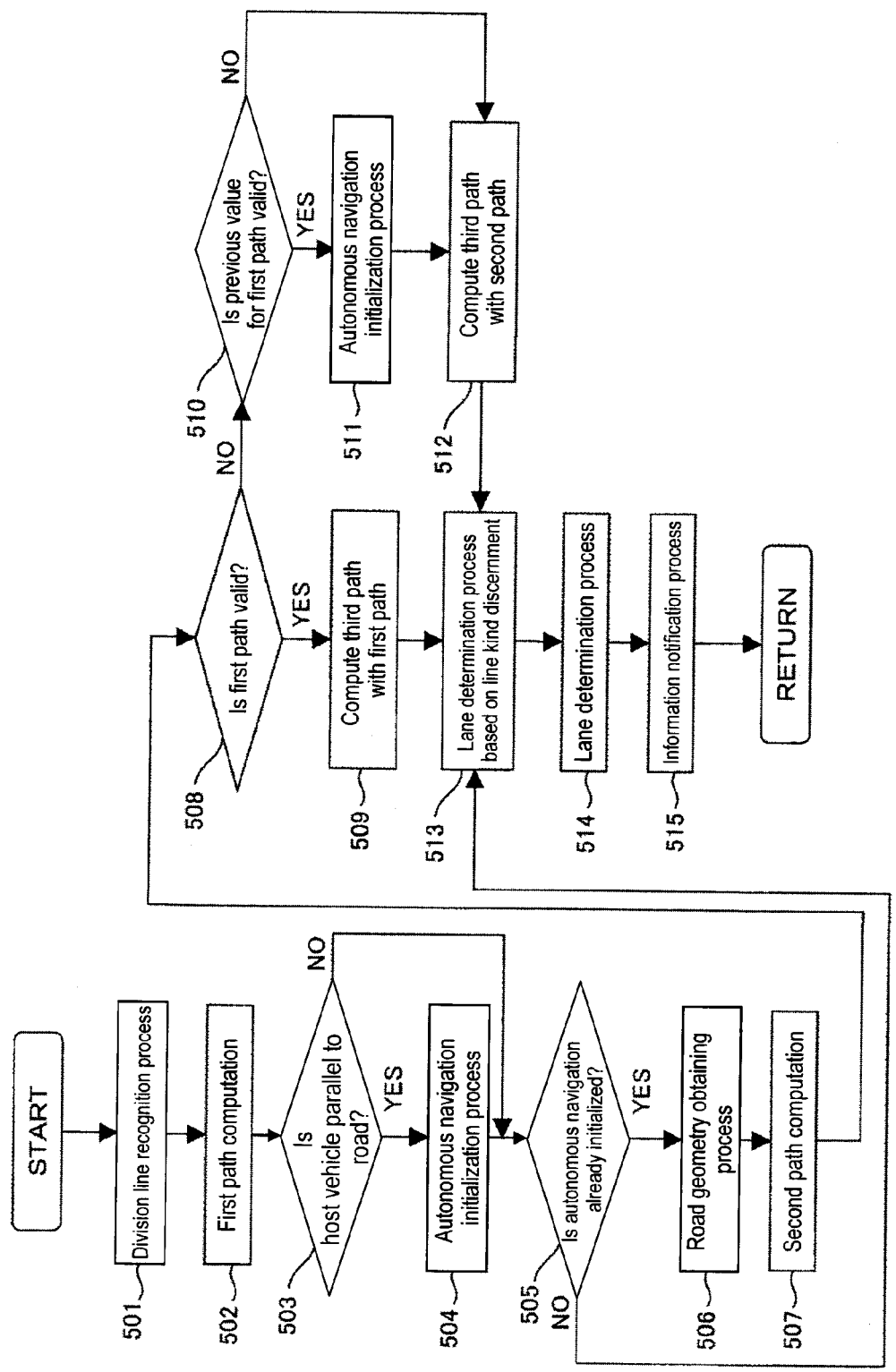
FIG. 5 is a flowchart showing the content of processing by a lane determining device in another embodiment.

FIG. 5 is a flowchart showing the content of processing by the lane determining device shown in FIG. 4.

First, in process 501, the distance from the division line recognized by the division line recognition means 2 to the imaging means is repeatedly computed and, further, the kind (solid line, dashed line, dotted line, etc.) of the division line is discerned.

Next, in process 502, a travel path (first path) of the host vehicle is computed based on the distance from the division line to the imaging means computed in process 501.

Next, in process 503, it is determined whether or not the host vehicle is traveling parallel to the road. If the host vehicle is traveling parallel to the road, the flow proceeds to process 504, and if the host vehicle is not traveling parallel to the road, the flow proceeds to process 505. Here, the determination as to whether or not the host vehicle is traveling parallel to the road is performed under the condition that the angle difference between the travel direction of the host vehicle estimated by the travel direction estimation means 7 and the direction of the division line recognized by the division line recognition means 2 is within a predetermined angle (e.g., within 2 degrees) or the change in the angle difference is within a predetermined value (e.g., 1 degree/second), that the vehicle speed detected by the vehicle speed detection means 4 is equal to or greater than a predetermined speed (e.g., 10 km/h or greater), and that the rate of change in the host vehicle heading (angular speed) detected by the heading detection means 5 is within a predetermined range (e.g., within 0.2 degrees/second).

In process 504, since the host vehicle is parallel to the road and the estimation accuracies for heading and position are presumably high, autonomous navigation is initialized. With respect to the method of this initialization, the value of the first path is assigned for the horizontal position on the road (y in FIG. 10 described later), and the travel direction of the host vehicle estimated by the travel direction estimation means 7 is assigned for heading. Specifically, the travel path of the host vehicle is traced back by a predetermined period, and the gradient of a regression line based on the least squares method is taken to be the travel direction.

Next, in process 505, it is determined whether or not autonomous navigation is already initialized. If autonomous navigation is already initialized, the flow proceeds to process 506. If autonomous navigation is not already initialized, the flow proceeds to process 513.

In process 506, the road geometry (number of lanes, lane width, radius of curvature of the road, etc.) of the road the host vehicle is traveling on is obtained by the road geometry obtaining means 12. In process 507, a travel path (second path) of the host vehicle is computed based on the obtained road geometry and on autonomous navigation.

Next, in process 508, it is determined whether or not the first path is valid. If the first path is valid, the flow proceeds to process 509, and the first path is computed as the third path. On the other hand, if the first path is not valid, the flow proceeds to process 510. Here, the first path's being valid indicates a case where a division line is recognized by the division line recognition means 2, and the first path's not being valid indicates a case where a division line is not recognized by the division line recognition means 2.

In process 510, it is determined whether or not the previous computed value for the first path is valid. If the previous computed value for the first path is valid, the flow proceeds to process 511. If the previous computed value for the first path is not valid, the flow proceeds to process 512.

In process 511, in order to compute the third path after errors in the second path have been reduced, autonomous navigation is initialized. For this initialization, the same method as that in process 504 is used.

Next, in process 512, the second path is computed as the third path.

Next, in process 513, a lane determination process based on line kind discernment is performed. Here, the lane the host vehicle is traveling in is determined using the kind (solid line, dashed line, dotted line, etc.) of the division line recognized by the division line recognition means 2. For example, in the case of a Japanese highway with three lanes in each direction, division line kinds would be arranged in the following order from the left: solid line; dashed line; dashed line; solid line. Accordingly, if the kind(s) of the division lines on both sides of the host vehicle can be recognized, the lane the host vehicle is traveling in is naturally determinable.

Next, in process 514, the lane the host vehicle is traveling in is determined using the third path computed in process 509 or process 512. Specifically, it need only be determined at which position the horizontal position of the third path lies on a road with a plurality of lanes, and this is determined using information on the number of lanes and lane width. It is noted that if the lane the host vehicle is traveling in has been determined through line kind discernment in process 513, the lane determined using the third path is not employed, and the lane determined through line kind discernment is employed with priority. In so doing, if the lane determined through line kind discernment differs from the lane determined based on the third path, the horizontal position of the third path is corrected to the lane position determined through line kind discernment. As discussed earlier, a predetermined distance needs to be traveled for line kind discernment and response is therefore slow, but reliability is high. On the other hand, if a long period of time elapses after the first path becomes invalid due to repeated meandering by the host vehicle, etc., errors in the second path based on autonomous navigation accumulate. Even if a division line were recognized thereafter, it would not be possible to trace the travel path with a method based on the distance from the distance from the division line to the imaging means since it cannot be identified which division line it is. Thus, as a back up for special driving conditions, the above-mentioned correction based on line kind discernment is used.

Finally, in process 515, based on information on the lane the host vehicle is traveling in found in process 514, road directions are changed, and information is notified to the passengers using audio or the screen.

As described above, according to the lane determining device 100 above, a division line provided on a road with a plurality of lanes in each direction is detected, and the lane the host vehicle is traveling in is determined based on a travel path of the host vehicle computed based on the relationship between this division line and the host vehicle and on autonomous navigation. Thus, the distance traveled before the lane traveled is determined can be shortened, and errors that accumulate in proportion to the distance traveled can be reduced. In addition, through autonomous navigation that utilizes road geometry, accurate lane determination becomes possible even on roads other than straight roads, such as curves, etc. Therefore, it is possible to quickly and accurately determine the lane the host vehicle is traveling in.

Accordingly, in giving directions at a fork in a highway or in giving directions on which way to go at an intersection located ahead of the vehicle by way of a navigation system, for example, it is possible to perform differentiated route guidance per lane, and to improve passenger comfort by thus achieving advanced route guidance for passengers.

Next, with reference to FIG. 6 through FIG. 9, a method of computing the second path that utilizes road geometry will be described in detail applying a certain road situation.

Figure 6:
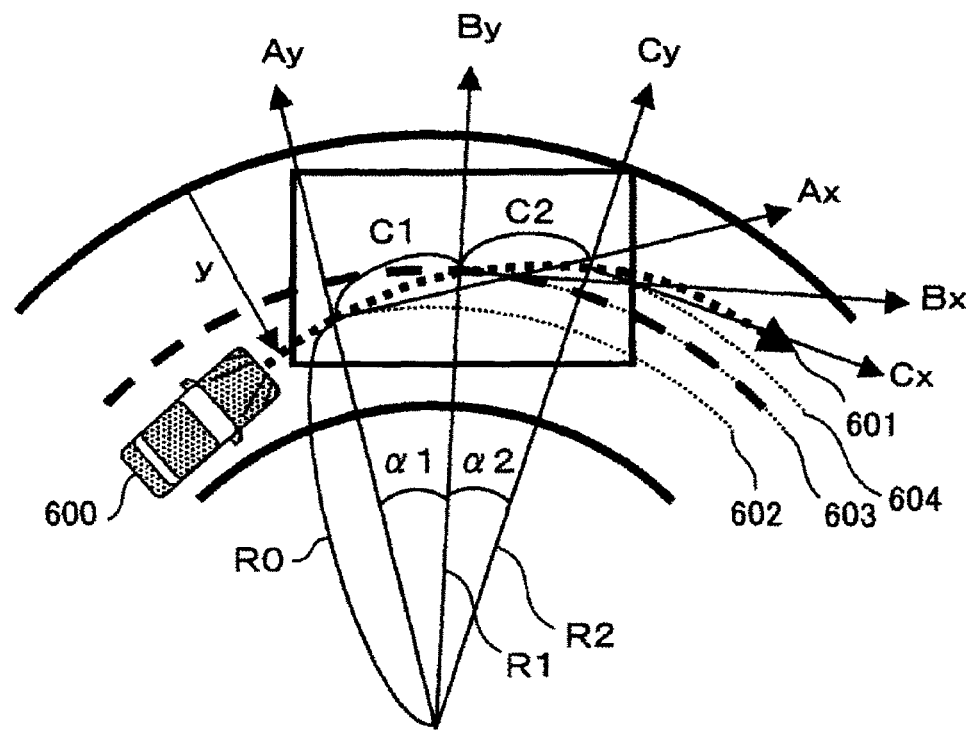
FIG. 6 shows illustrative diagram 1 for finding the position of a host vehicle turning a right curve.
Figure 6:
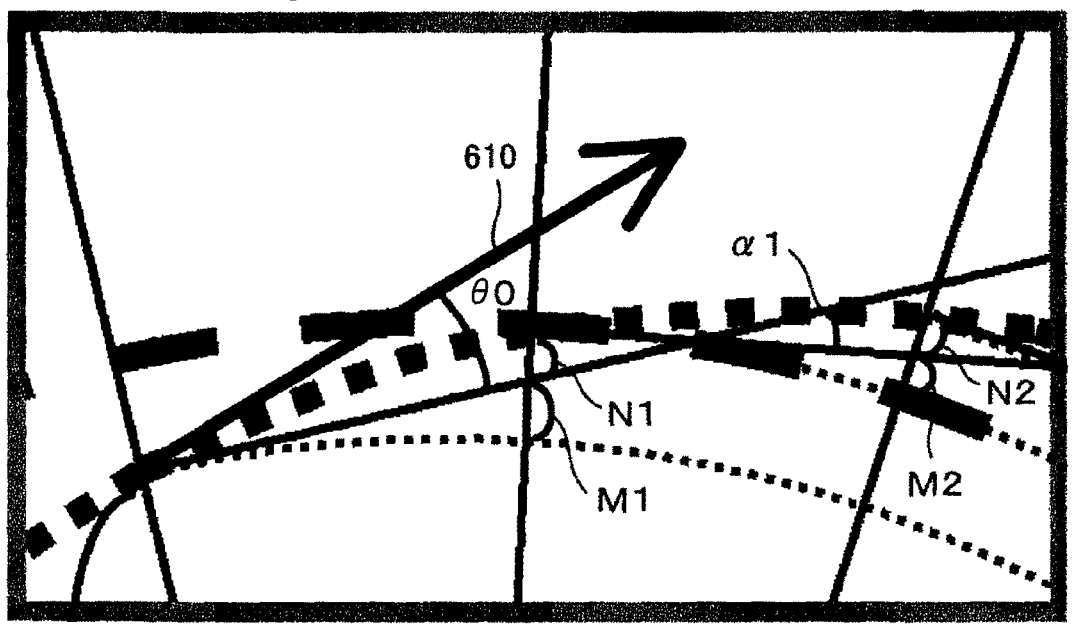

FIG. 6 is a diagram showing a case where a host vehicle 600 changes lanes from the right lane to the left lane following the path of dotted line arrow 601 on a road with two lanes in each direction and that turns rightward.

In FIG. 6, it is assumed that the first path has become invalid when the host vehicle 600 reached axis Ay. It is noted that axis Ay, axis By and axis Cy are oriented so as to be at right angles with the road, and axis Ax, axis Bx and axis Cx are respectively oriented so as to be at right angles with axis Ay, axis By and axis Cy (i.e., in the directions of tangents to the road).

First, as the first path becomes invalid once the host vehicle 600 reaches axis Ay, initialization of autonomous navigation is performed (process 511). At this point, arrow 610 indicates the travel direction of the host vehicle estimated by the travel direction estimation means 7, and the angle it forms with the road is θ0. Accordingly, θ0 is taken to be the initial heading for autonomous navigation. In addition, the leftmost division line is defined as a reference division line, and assuming the distance from this reference division line is y, distance y0 from the reference division line derived from the previous value for the first path is taken to be the initial position for autonomous navigation. It is noted that dotted line 602 represents positions whose distances from the reference division line are uniform at y0.

Next, distance y1 from the reference division line when the host vehicle 600 has reached axis By is computed. Using radius of curvature R0 of the road along axis Ay, and distance C1 from axis Ay to axis By (computed by integrating the vehicle speed of the host vehicle 600), angle α1 formed between axis Ay and axis By may be calculated through Equation (3).

[Equation 3]

$$\alpha 1 = C1/R0 \qquad (3)$$

Assuming angle α1 formed between axis Ay and axis By is sufficiently small, distance N1 along axis By between axis Ax and travel path 601 of the vehicle 600 may be calculated through Equation (4).

[Equation 4]

$$N1 = C1 \times \sin \theta 0 \qquad (4)$$

Similarly, assuming angle α1 formed between axis Ay and axis By is sufficiently small, distance M1 between axis Ax and axis Bx along axis By may be calculated through Equation (5).

[Equation 5]

$$M1 = R0 - \sqrt{R0^2 - C1^2} \qquad (5)$$

Accordingly, distance y1 from the reference division line when the host vehicle 600 has reached axis By may be calculated through Equation (6).

[Equation 6]

$$y1 = y0 - N1 - M1 \qquad (6)$$

It is noted that dotted line 603 represents positions whose distances from the reference division line are uniform at y1.

Next, distance y2 from the reference division line when the host vehicle 600 has reached axis Cy is computed. Using radius of curvature R1 of the road along axis By, and distance C2 from axis By to axis Cy (computed by integrating the vehicle speed of the host vehicle 600), angle α2 formed between axis By and axis Cy may be calculated through Equation (7).

[Equation 7]

$$\alpha 2 = C2/R1 \qquad (7)$$

Assuming angle α2 formed between axis By and axis Cy is sufficiently small, distance N2 along axis Cy between axis Bx and travel path 601 of the vehicle 600 may be calculated through Equation (8) using heading θ1 of autonomous navigation relative to the road along axis By.

[Equation 8]

$$N2 = C2 \times \sin \theta 1 \qquad (8)$$

It is noted that heading θ1 of autonomous navigation relative to the road may be calculated through Equation (9) using the amount of change δ1 in heading detected by the heading detection means 5 up to when the vehicle 600 reaches axis Cy from axis By.

[Equation 9]

$$\theta 1 = \theta 0 + \delta 1 - \alpha 1 \qquad (9)$$

Similarly, assuming angle α2 formed between axis By and axis Cy is sufficiently small, distance M2 between axis Bx and axis Cx along axis Cy may be calculated through Equation (10).

[Equation 10]

$$M2 = R1 - \sqrt{R1^2 - C2^2} \qquad (10)$$

Accordingly, distance y2 from the reference division line when the host vehicle 600 has reached axis Cy may be calculated through Equation (11).

[Equation 11]

$$y2 = y1 - N2 - M2 \quad (11)$$

It is noted that dotted line 604 represents positions whose distances from the reference division line are uniform at y2.

As described above, even with respect to curved roads, it becomes possible to find the distance to the reference division line while converting coordinates. It is noted that calculation formulae for the nth coordinate conversion may be expressed by Equation (12) through Equation (16).

[Equation 12]

$$\alpha(n) = C(n)/R(n-1) \quad (12)$$

[Equation 13]

$$\theta(n) = \theta(n-1) + \delta(n) - \alpha(n) \quad (13)$$

[Equation 14]

$$N(n) = C(n) \times \sin\theta(n-1) \quad (14)$$

[Equation 15]

$$M(n) = R(n-1) - \sqrt{R(n-1)^2 - C(n)^2} \quad (15)$$

[Equation 16]

$$y(n) = y(n-1) - N(n) - M(n) \quad (16)$$

Figure 7:
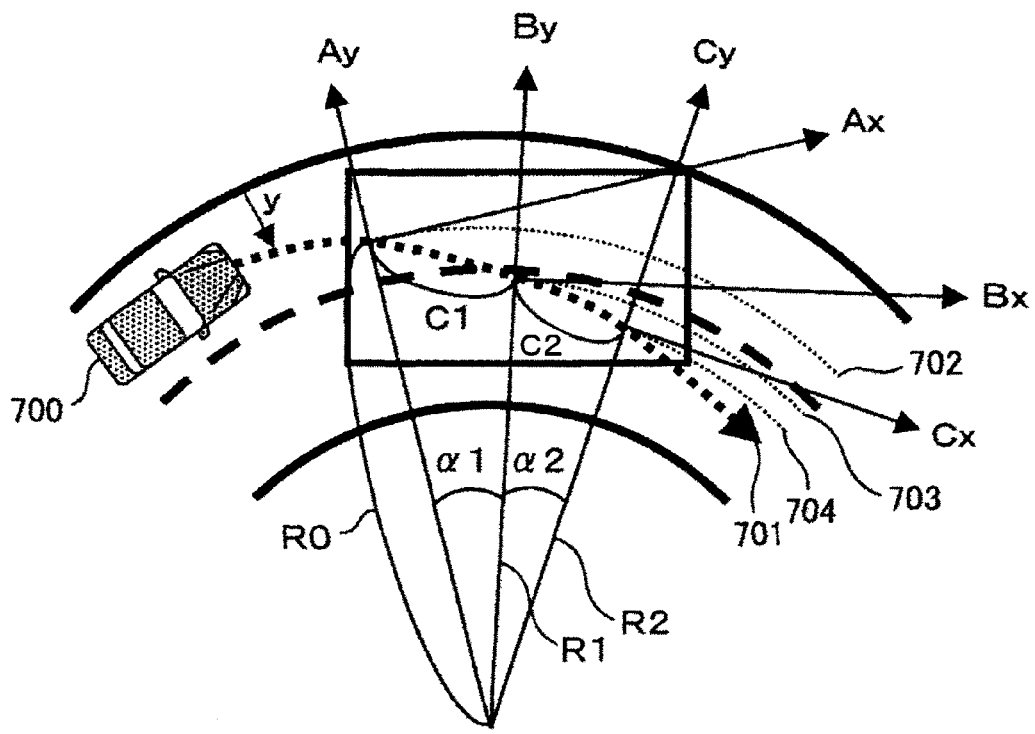
FIG. 7 shows illustrative diagram 2 for finding the position of a host vehicle turning a right curve.
Figure 7:
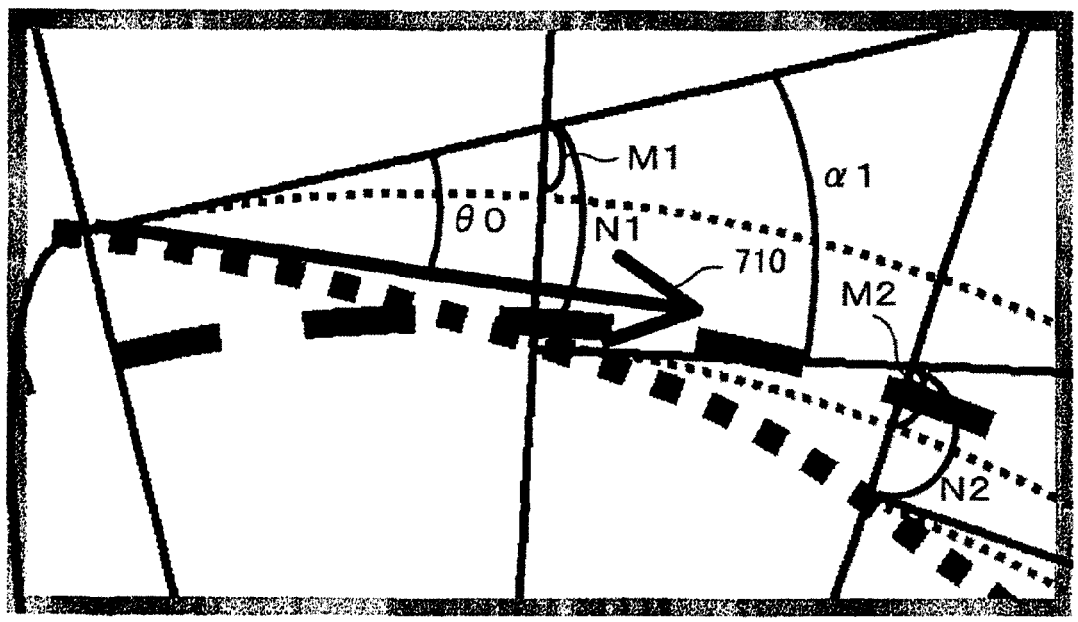

FIG. 7 is a diagram showing a case where a host vehicle 700 changes lanes from the left lane to the right lane following the path of dotted line arrow 701 on a road with two lanes in each direction and that turns rightward.

In FIG. 7, it is assumed that the first path has become invalid when the host vehicle 700 reached axis Ay. It is noted that axis Ay, axis By and axis Cy are oriented so as to be at right angles with the road, and axis Ax, axis Bx and axis Cx are respectively oriented so as to be at right angles with axis Ay, axis By and axis Cy (i.e., in the directions of tangents to the road).

First, as the first path becomes invalid once the host vehicle 700 reaches axis Ay, initialization of autonomous navigation is performed (process 511). At this point, arrow 710 indicates the travel direction of the host vehicle estimated by the travel direction estimation means 7, and the angle it forms with the road is θ0. Accordingly, θ0 is taken to be the initial heading for autonomous navigation. In addition, the leftmost division line is defined as a reference division line, and assuming the distance from this reference division line is y, distance y0 from the reference division line derived from the previous value for the first path is taken to be the initial position for autonomous navigation. It is noted that dotted line 702 represents positions whose distances from the reference division line are uniform at y0.

Next, distance y1 from the reference division line when the host vehicle 700 has reached axis By is computed. Using radius of curvature R0 of the road along axis Ay, and distance C1 from axis Ay to axis By (computed by integrating the vehicle speed of the host vehicle 700), angle α1 formed between axis Ay and axis By may be calculated through Equation (17).

[Equation 17]

$$\alpha1 = C1/R0 \quad (17)$$

Assuming angle α1 formed between axis Ay and axis By is sufficiently small, distance N1 along axis By between axis Ax and travel path 701 of the vehicle 700 may be calculated through Equation (18).

[Equation 18]

$$N1 = C1 \times \sin\theta0 \quad (18)$$

Similarly, assuming angle α1 formed between axis Ay and axis By is sufficiently small, distance M1 between axis Ax and axis Bx along axis By may be calculated through Equation (19).

[Equation 19]

$$M1 = R0 - \sqrt{R0^2 - C1^2} \quad (19)$$

Accordingly, distance y1 from the reference division line when the host vehicle 700 has reached axis By may be calculated through Equation (20).

[Equation 20]

$$y1 = y0 + N1 - M1 \quad (20)$$

It is noted that dotted line 703 represents positions whose distances from the reference division line are uniform at y1.

Next, distance y2 from the reference division line when the host vehicle 700 has reached axis Cy is computed. Using radius of curvature R1 of the road along axis By, and distance C2 from axis By to axis Cy (computed by integrating the vehicle speed of the host vehicle 700), angle α2 formed between axis By and axis Cy may be calculated through Equation (21).

[Equation 21]

$$\alpha2 = C2/R1 \quad (21)$$

Assuming angle α2 formed between axis By and axis Cy is sufficiently small, distance N2 along axis Cy between axis Bx and travel path 701 of the vehicle 700 may be calculated through Equation (22) using heading θ1 of autonomous navigation relative to the road along axis By.

[Equation 22]

$$N2 = C2 \times \sin\theta1 \quad (22)$$

It is noted that heading θ1 of autonomous navigation relative to the road may be calculated through Equation (23) using the amount of change δ1 in heading detected by the heading detection means 5 up to when the vehicle 700 reaches axis Cy from axis By.

[Equation 23]

$$\theta1 = \theta0 + \delta1 - \alpha1 \quad (23)$$

Similarly, assuming angle α2 formed between axis By and axis Cy is sufficiently small, distance M2 along axis Cy between axis Bx and axis Cx may be calculated through Equation (24).

[Equation 24]

$$M2 = R1 - \sqrt{R1^2 - C2^2} \quad (24)$$

Accordingly, distance y2 from the reference division line when the host vehicle 700 has reached axis Cy may be calculated through Equation (25).

[Equation 25]

$$y2 = y1 + N2 - M2 \quad (25)$$

It is noted that dotted line 704 represents positions whose distances from the reference division line are uniform at y2.

As described above, even with respect to curved roads, it becomes possible to find the distance to the reference division line while converting coordinates. It is noted that calculation formulae for the nth coordinate conversion may be expressed by Equation (26) through Equation (30).

[Equation 26]
$$\alpha(n) = C(n)/R(n-1) \quad (26)$$

[Equation 27]
$$\theta(n) = \theta(n-1) + \delta(n) - \alpha(n) \quad (27)$$

[Equation 28]
$$N(n) = C(n) \times \sin\theta(n-1) \quad (28)$$

[Equation 29]
$$M(n) = R(n-1) - \sqrt{R(n-1)^2 - C(n)^2} \quad (29)$$

[Equation 30]
$$y(n) = y(n-1) + N(n) - M(n) \quad (30)$$

Figure 8:
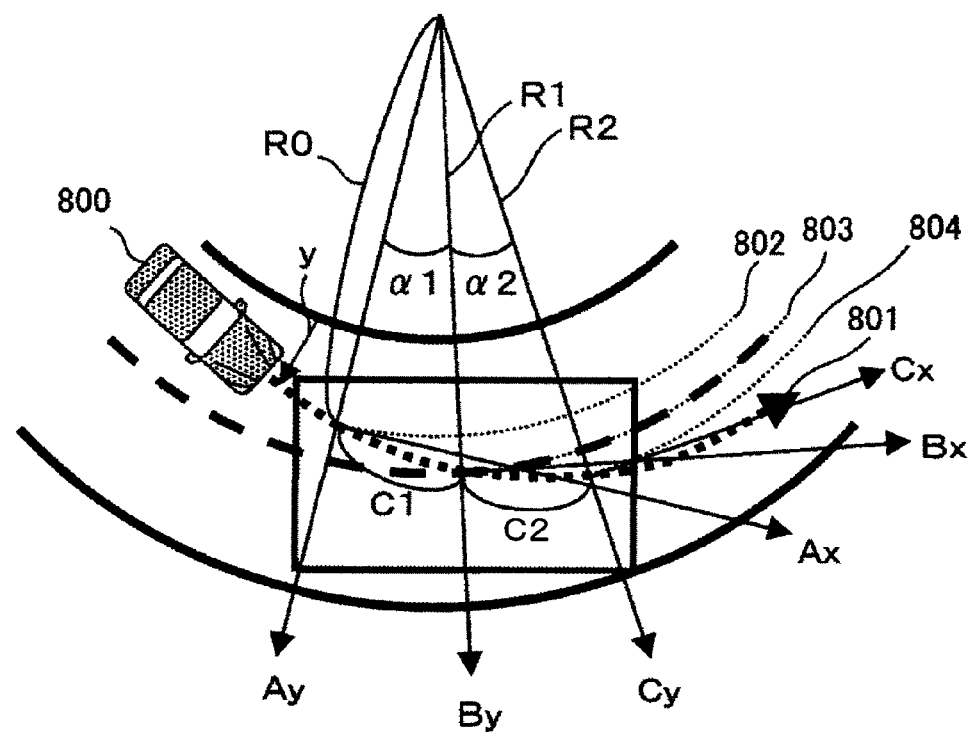
FIG. 8 shows illustrative diagram 1 for finding the position of a host vehicle turning a left curve.
Figure 8:
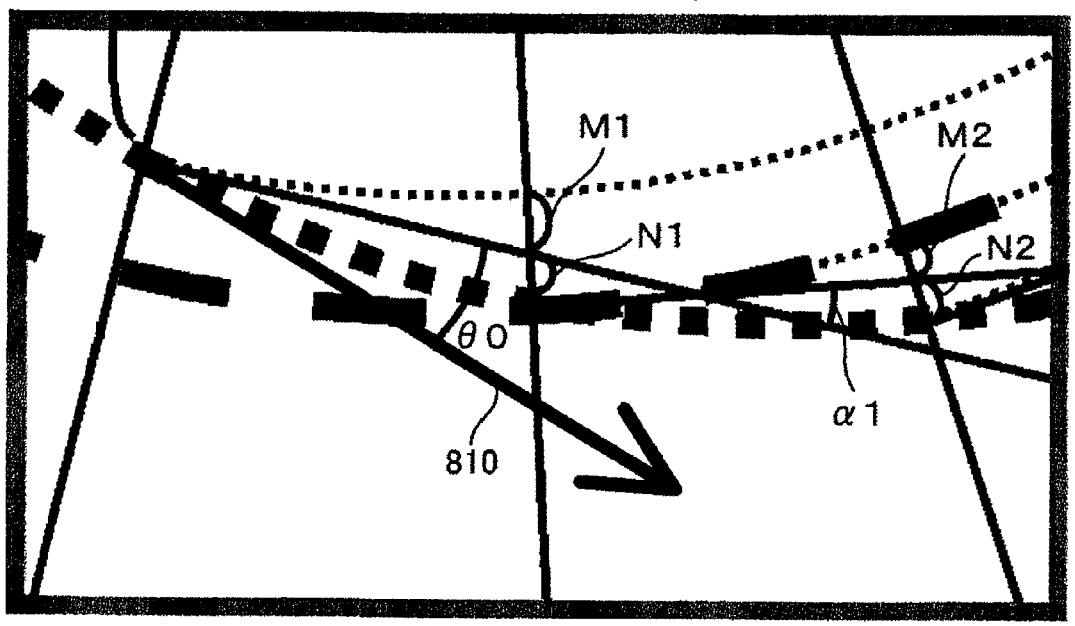

FIG. 8 is a diagram showing a case where a host vehicle 800 changes lanes from the left lane to the right lane following the path of dotted line arrow 801 on a road with two lanes in each direction and that turns rightward.

In FIG. 8, it is assumed that the first path has become invalid when the host vehicle 800 reached axis Ay. It is noted that axis Ay, axis By and axis Cy are oriented so as to be at right angles with the road, and axis Ax, axis Bx and axis Cx are respectively oriented so as to be at right angles with axis Ay, axis By and axis Cy (i.e., in the directions of tangents to the road).

First, as the first path becomes invalid once the host vehicle 800 reaches axis Ay, initialization of autonomous navigation is performed (process 511). At this point, arrow 810 indicates the travel direction of the host vehicle estimated by the travel direction estimation means 7, and the angle it forms with the road is θ0. Accordingly, θ0 is taken to be the initial heading for autonomous navigation. In addition, the leftmost division line is defined as a reference division line, and assuming the distance from this reference division line is y, distance y0 from the reference division line derived from the previous value for the first path is taken to be the initial position for autonomous navigation. It is noted that dotted line 802 represents positions whose distances from the reference division line are uniform at y0.

Next, distance y1 from the reference division line when the host vehicle 800 has reached axis By is computed. Using radius of curvature R0 of the road along axis Ay, and distance C1 from axis Ay to axis By (computed by integrating the vehicle speed of the host vehicle 800), angle α1 formed between axis Ay and axis By may be calculated through Equation (31).

[Equation 31]
$$\alpha 1 = C1/R0 \quad (31)$$

Assuming angle α1 formed between axis Ay and axis By is sufficiently small, distance N1 along axis By between axis Ax and travel path 801 of the vehicle 800 may be calculated through Equation (32).

[Equation 32]
$$N1 = C1 \times \sin\theta 0 \quad (32)$$

Similarly, assuming angle α1 formed between axis Ay and axis By is sufficiently small, distance M1 between axis Ax and axis Bx along axis By may be calculated through Equation (33).

[Equation 33]
$$M1 = R0 - \sqrt{R0^2 - C1^2} \quad (33)$$

Accordingly, distance y1 from the reference division line when the host vehicle 800 has reached axis By may be calculated through Equation (34).

[Equation 34]
$$y1 = y0 + N1 + M1 \quad (34)$$

It is noted that dotted line 803 represents positions whose distances from the reference division line are uniform at y1.

Next, distance y2 from the reference division line when the host vehicle 800 has reached axis Cy is computed. Using radius of curvature R1 of the road along axis By, and distance C2 from axis By to axis Cy (computed by integrating the vehicle speed of the host vehicle 800), angle α2 formed between axis By and axis Cy may be calculated through Equation (35).

[Equation 35]
$$\alpha 2 = C2/R1 \quad (35)$$

Assuming angle α2 formed between axis By and axis Cy is sufficiently small, distance N2 along axis Cy between axis Bx and travel path 801 of the vehicle 800 may be calculated through Equation (36) using heading θ1 of autonomous navigation relative to the road along axis By.

[Equation 36]
$$N2 = C2 \times \sin\theta 1 \quad (36)$$

It is noted that heading θ1 of autonomous navigation relative to the road may be calculated through Equation (37) using the amount of change δ1 in heading detected by the heading detection means 5 up to when the vehicle 800 reaches axis Cy from axis By.

[Equation 37]
$$\theta 1 = \theta 0 + \delta 1 - \alpha 1 \quad (37)$$

Similarly, assuming angle α2 formed between axis By and axis Cy is sufficiently small, distance M2 between axis Bx and axis Cx along axis Cy may be calculated through Equation (38).

[Equation 38]
$$M2 = R1 - \sqrt{R1^2 - C2^2} \quad (38)$$

Accordingly, distance y2 from the reference division line when the host vehicle 800 has reached axis Cy may be calculated through Equation (39).

[Equation 39]
$$y2 = y1 + N2 + M2 \quad (39)$$

It is noted that dotted line 804 represents positions whose distances from the reference division line are uniform at y2.

As described above, even with respect to curved roads, it becomes possible to find the distance to the reference division line while converting coordinates. It is noted that calculation formulae for the nth coordinate conversion may be expressed by Equation (40) through Equation (44).

[Equation 40]
$$\alpha(n)=C(n)/R(n-1) \quad (40)$$

[Equation 41]
$$\theta(n)=\theta(n-1)+\delta(n)-\alpha(n) \quad (41)$$

[Equation 42]
$$N(n)=C(n)\times\sin\theta(n-1) \quad (42)$$

[Equation 43]
$$M(n)=R(n-1)-\sqrt{R(n-1)^2-C(n)^2} \quad (43)$$

[Equation 44]
$$y(n)=y(n-1)+N(n)+M(n) \quad (44)$$

Figure 9:
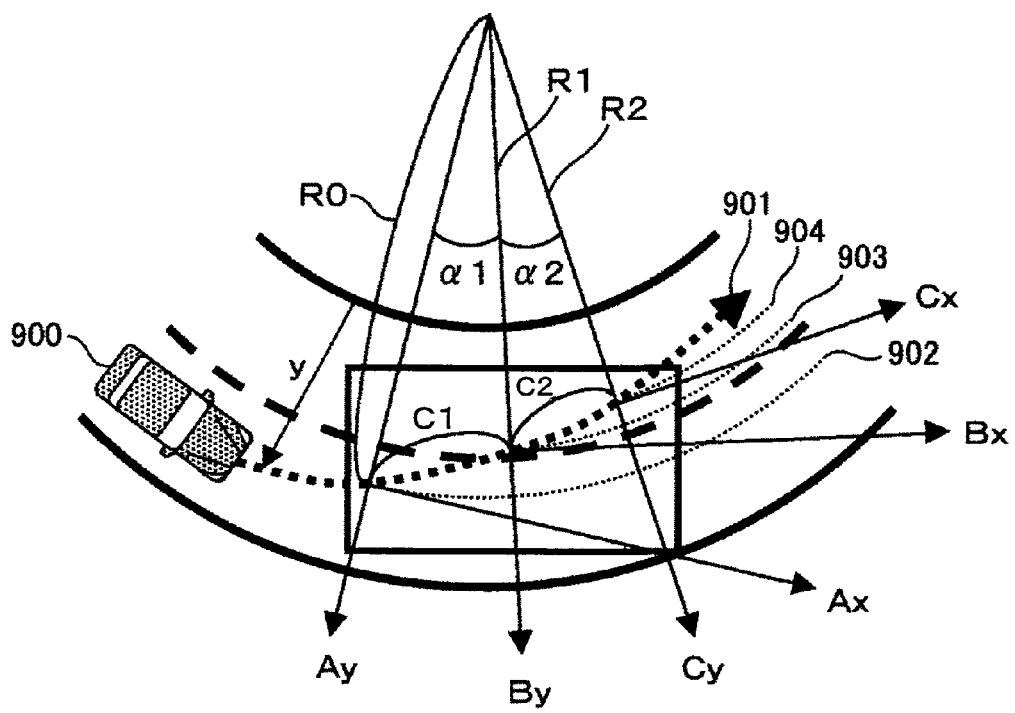
FIG. 9 shows illustrative diagram 2 for finding the position of a host vehicle turning a left curve.
Figure 9:
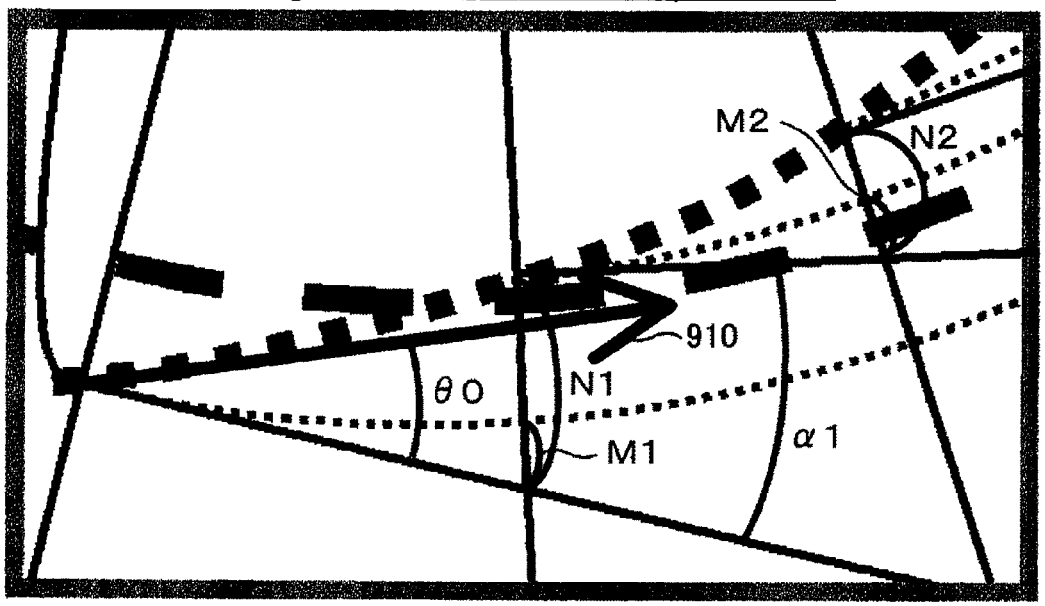

FIG. 9 is a diagram showing a case where a host vehicle 900 changes lanes from the left lane to the right lane following the path of dotted line arrow 901 on a road with two lanes in each direction and that turns rightward.

In FIG. 9, it is assumed that the first path has become invalid when the host vehicle 900 reached axis Ay. It is noted that axis Ay, axis By and axis Cy are oriented so as to be at right angles with the road, and axis Ax, axis Bx and axis Cx are respectively oriented so as to be at right angles with axis Ay, axis By and axis Cy (i.e., in the directions of tangents to the road).

First, as the first path becomes invalid once the host vehicle 900 reaches axis Ay, initialization of autonomous navigation is performed (process 511). At this point, arrow 910 indicates the travel direction of the host vehicle estimated by the travel direction estimation means 7, and the angle it forms with the road is θ0. Accordingly, θ0 is taken to be the initial heading for autonomous navigation. In addition, the leftmost division line is defined as a reference division line, and assuming the distance from this reference division line is y, distance y0 from the reference division line derived from the previous value for the first path is taken to be the initial position for autonomous navigation. It is noted that dotted line 902 represents positions whose distances from the reference division line are uniform at y0.

Next, distance y1 from the reference division line when the host vehicle 900 has reached axis By is computed. Using radius of curvature R0 of the road along axis Ay, and distance C1 from axis Ay to axis By (computed by integrating the vehicle speed of the host vehicle 900), angle α1 formed between axis Ay and axis By may be calculated through Equation (45).

[Equation 45]
$$\alpha1=C1/R0 \quad (45)$$

Assuming angle α1 formed between axis Ay and axis By is sufficiently small, distance N1 along axis By between axis Ax and travel path 901 of the vehicle 900 may be calculated through Equation (46).

[Equation 46]
$$N1=C1\times\sin\theta0 \quad (46)$$

Similarly, assuming angle α1 formed between axis Ay and axis By is sufficiently small, distance M1 between axis Ax and axis Bx along axis By may be calculated through Equation (47).

[Equation 47]
$$M1=R0-\sqrt{R0^2-C1^2} \quad (47)$$

Accordingly, distance y1 from the reference division line when the host vehicle 900 has reached axis By may be calculated through Equation (48).

[Equation 48]
$$y1=y0-N1+M1 \quad (48)$$

It is noted that dotted line 903 represents positions whose distances from the reference division line are uniform at y1.

Next, distance y2 from the reference division line when the host vehicle 900 has reached axis Cy is computed. Using radius of curvature R1 of the road along axis By, and distance C2 from axis By to axis Cy (computed by integrating the vehicle speed of the host vehicle 900), angle α2 formed between axis By and axis Cy may be calculated through Equation (49).

[Equation 49]
$$\alpha2=C2/R1 \quad (49)$$

Assuming angle α2 formed between axis By and axis Cy is sufficiently small, distance N2 along axis Cy between axis Bx and travel path 901 of the vehicle 900 may be calculated through Equation (50) using heading θ1 of autonomous navigation relative to the road along axis By.

[Equation 50]
$$N2=C2\times\sin\theta1 \quad (50)$$

It is noted that heading θ1 of autonomous navigation relative to the road may be calculated through Equation (51) using the amount of change δ1 in heading detected by the heading detection means 5 up to when the vehicle 900 reaches axis Cy from axis By.

[Equation 51]
$$\theta1=\theta0+\delta1-\alpha1 \quad (51)$$

Similarly, assuming angle α2 formed between axis By and axis Cy is sufficiently small, distance M2 along axis Cy between axis Bx and axis Cx may be calculated through Equation (52).

[Equation 52]
$$M2=R1-\sqrt{R1^2-C2^2} \quad (52)$$

Accordingly, distance y2 from the reference division line when the host vehicle 900 has reached axis Cy may be calculated through Equation (53).

[Equation 53]
$$y2=y1-N2+M2 \quad (53)$$

It is noted that dotted line 904 represents positions whose distances from the reference division line are uniform at y2.

As described above, even with respect to curved roads, it becomes possible to find the distance to the reference division line while converting coordinates. It is noted that calculation formulae for the nth coordinate conversion may be expressed by Equation (54) through Equation (58).

[Equation 54]

$$\alpha(n) = C(n)/R(n-1) \quad (54)$$

[Equation 55]

$$\theta(n) = \theta(n-1) + \delta(n) - \alpha(n) \quad (55)$$

[Equation 56]

$$N(n) = C(n) \times \sin \theta(n-1) \quad (56)$$

[Equation 57]

$$M(n) = R(n-1) - \sqrt{R(n-1)^2 - C(n)^2} \quad (57)$$

[Equation 58]

$$y(n) = y(n-1) - N(n) + M(n) \quad (58)$$

With the method described with respect to FIG. 6 through FIG. 9, computation errors become reduced as the calculation period is shortened. It is therefore preferable that the computation period be, for example, 100 ms or shorter. In addition, since the term M(n) becomes an extremely small value when the computation period is shortened, the scheme may be arranged such that y(n) is found while disregarding the term M(n).

Next, with reference to FIG. 10, a specific example of a lane determination process of the lane determining device 100 will be described applying a certain road situation.

Figure 10:
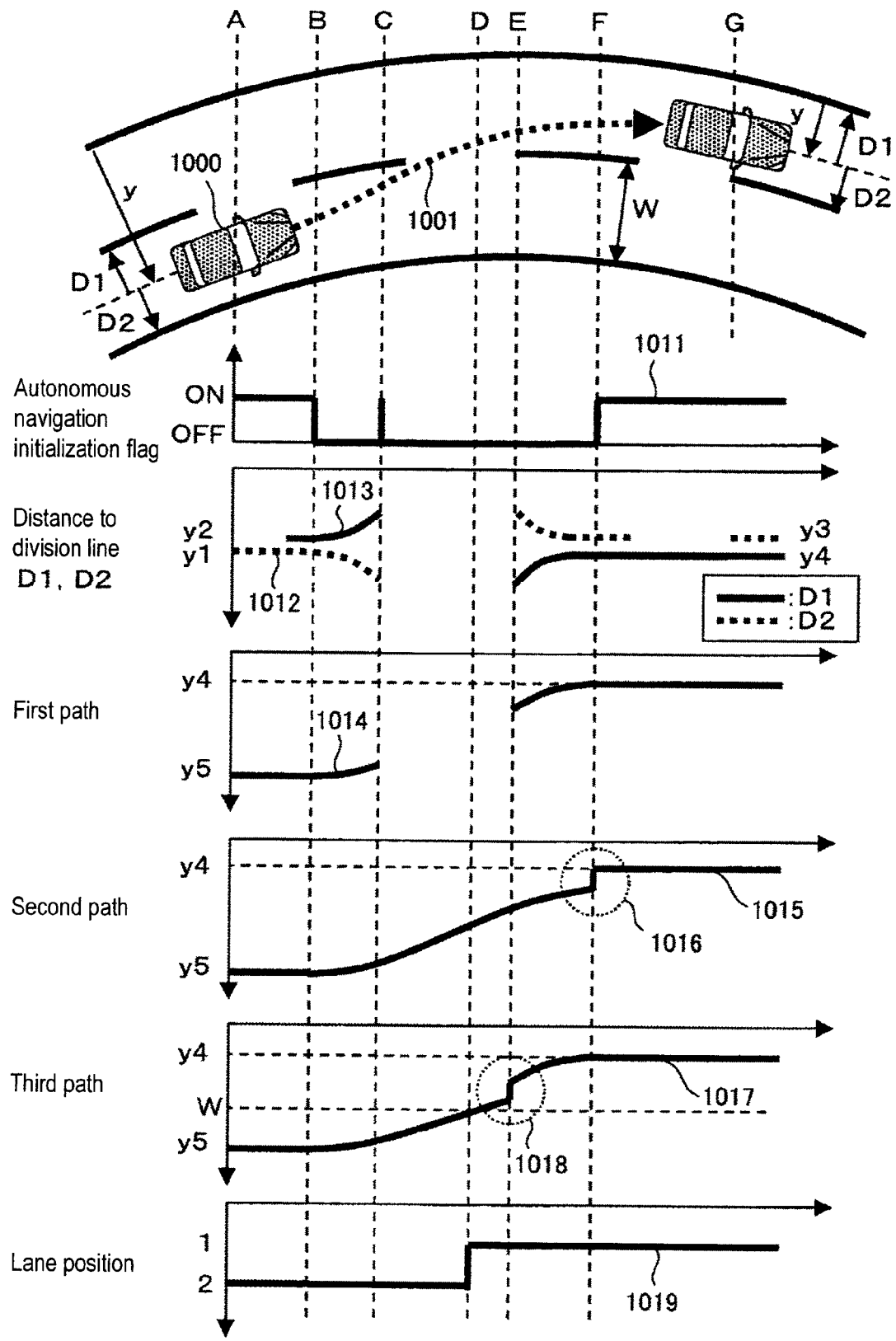
FIG. 10 is a diagram illustrating a specific example.

FIG. 10 is a diagram showing a case where a host vehicle 1000 changes lanes from the right lane to the left lane following the path of dotted line arrow 1001 on a road with two lanes in each direction and that turns rightward.

In FIG. 10, D1 represents the distance from the center of the vehicle to the division line seen on the left, and D2 the distance from the center of the vehicle to the division line seen on the right. The division lines concerned vary depending on whether the host vehicle 1000 is present in the left lane or the right lane. In addition, the distance from the leftmost division line to the host vehicle 1000 is denoted y. Further, lane width is denoted W and may be obtained by the road geometry obtaining means 12, or the sum of D1 and D2 may be employed.

First, when the host vehicle 1000 is present at spot A, it is determined that the host vehicle 1000 is traveling parallel to the road (YES in process 503, autonomous navigation initialization flag 1011 is ON), and an autonomous navigation initialization process is performed (process 504). At this point, since only D2 is valid (D1 is undetectable due to a break in the dashed line), when first path 1014 is computed using D2 (process 502), and the position of autonomous navigation is set to y5 and heading to the heading derived with first path 1014, the path computed by autonomous navigation turns out to be like second path 1015 when the method described with FIG. 6 through FIG. 9 is used (process 507). Here, since the previous calculated value for lane position 1019 is 2 (right lane), y5 is computed by adding lane width W to y1 (y5=y1+W). Further, since first path 1014 is valid (YES in process 508), first path 1014 is substituted into third path 1017 (process 509), and the lane the host vehicle is traveling in is determined (process 514). In this case, since y5>W, the lane the host vehicle is traveling in would be 2 (right lane) as indicated by lane position 1019. In addition, since the host vehicle 1000 will be determined to be traveling parallel to the road (autonomous navigation initialization flag 1011 is ON) until it reaches spot B from spot A, the process thereafter is the same as when it is present at spot A. It is noted that although D1 becomes valid in the middle of host vehicle 1000's reaching spot B from spot A, since D2 is detected continuously, first path 1014 is computed with priority given to D2. However, if D1 is successfully detected a predetermined number of consecutive computations or more (e.g., five times or more), first path 1014 may be computed by switching to D1.

Next, once the host vehicle 1000 reaches spot B, since the host vehicle 1000 has started a lane change operation, it will be determined to be not traveling parallel to the road (NO in process 503), and autonomous navigation initialization flag 1011 becomes OFF. Then, although D1 and D2 respectively change until the host vehicle 1000 reaches spot C, since first path 1014 is valid (YES in process 508), first path 1014 is substituted into third path 1017 (process 509), and the lane the host vehicle is traveling in is determined (process 514). Thus, first path 1014 and third path 1017 are the same from spots A to C.

Next, once the host vehicle 1000 reaches spot C, and D1 and D2 become invalid (NO in process 508), autonomous navigation initialization flag 1011 becomes ON and autonomous navigation is initialized using first path 1014 (process 511), after which third path 1017 is extrapolated from second path 1015 (process 512). Further, once the host vehicle 1000 reaches spot D, since third path 1017 becomes smaller than lane width W, lane position 1019 that the host vehicle is traveling at changes to 1 (left lane) (process 514).

Next, once the host vehicle 1000 reaches spot E, and D1 and D2 become valid again (YES in process 508), since third path 1017 is returned to first path 1014 (process 509), if there are any errors in second path 1015, third path 1017 jumps as in area 1018.

Next, once the host vehicle 1000 reaches spot F, it is determined that the host vehicle 1000 is traveling parallel to the road (YES in process 503), autonomous navigation initialization flag 1011 becomes ON again, and autonomous navigation is initialized (process 504). At this point, if there are any errors in second path 1015, second path 1015 jumps as in area 1016.

Thereafter, it is determined that the host vehicle 1000 is traveling parallel to the road (autonomous navigation initialization flag 311 is ON) until the host vehicle 1000 reaches spot G.

As described above, by combining the distance from the host vehicle to the division line with autonomous navigation that takes road geometry into account, it becomes possible to trace an accurate travel path without any interruptions, and it is thus possible to quickly and accurately determine the lane the host vehicle is traveling in.

It is noted that although an example with respect to a road with two lanes in each direction was shown in FIG. 10, it goes without saying that it would still be applicable even if there are three or more lanes, and that it is applicable to lane changes from the left lane to the right lane as well.

In addition, since division line kinds often become irregular before and after junctions and forks, it is preferable that a lane determination process based on line kind discernment by process 513 not be performed. Specifically, process 513 is not performed within a predetermined distance (e.g., 200 m) before and after junctions and forks. However, exceptions apply if division line kinds before or after a junction or fork are successfully obtained by the road geometry obtaining means 12.

Next, with reference to FIG. 11, a specific example of an information notification process of the lane determining device 100 will be described.

FIG. 11(a) is a diagram showing a case where, as the host vehicle travels along a road with three lanes in each direction, there is displayed on a screen 1100 car mark 1102 for the host vehicle traveling on road 1101 and, further, indicator 1103 that indicates which lane the host vehicle is traveling in.

Indicator 1103 indicates which lane of the road with three lanes in each direction the host vehicle is traveling in, and displays car mark 1104 for the host vehicle based on the processing result of lane determination process 514. In this case, since it has been determined through lane determination process 514 that the host vehicle is traveling in the second lane (the second lane from the left), car mark 1104 for the host vehicle is displayed in the second lane.

Figure 11:
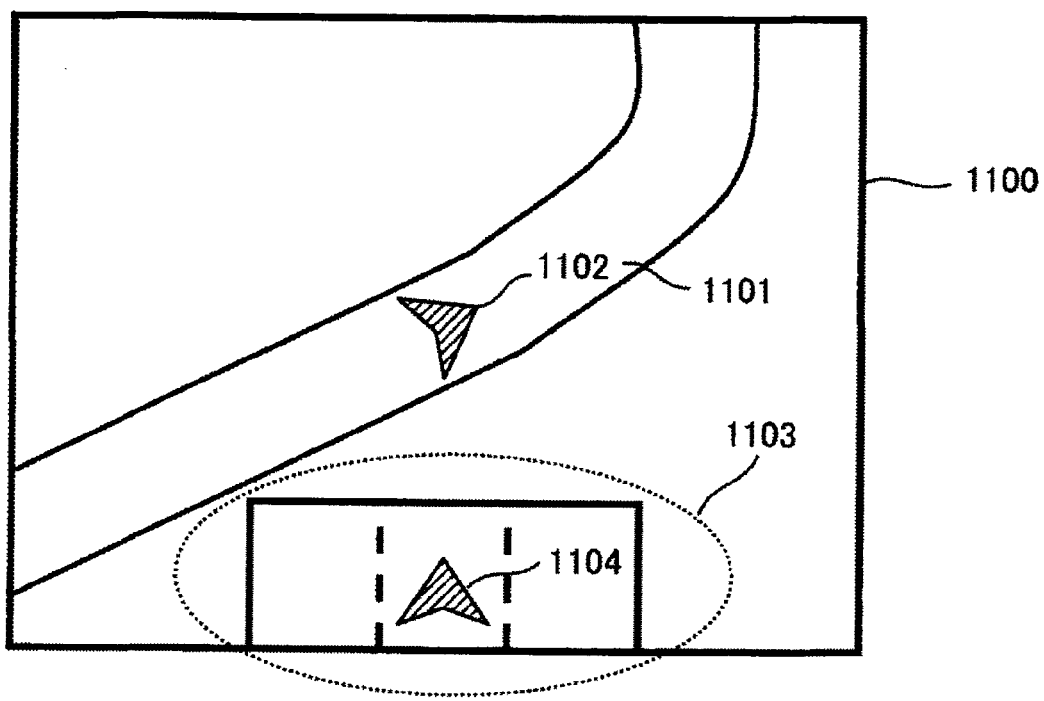
FIG. 11 is a diagram illustrating a notification screen by navigation.
Figure 11:
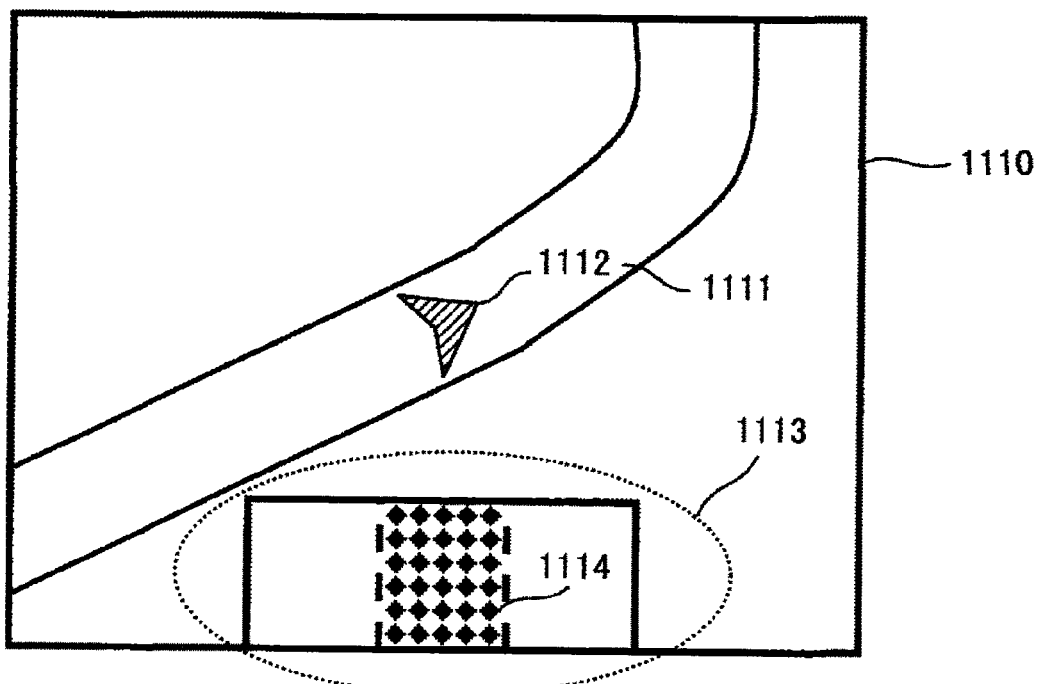

Similarly, FIG. 11(*b*) is a diagram showing a case where, as the host vehicle travels along a road with three lanes in each direction, there is displayed on a screen 1110 car mark 1112 for the host vehicle traveling on road 1111 and, further, indicator 1113 that indicates which lane the host vehicle is traveling in.

Indicator 1113 indicates which lane of the road with three lanes in each direction the host vehicle is traveling in, and displays the lane the host vehicle is traveling in as hatching 1114 based on the processing result of lane determination process 514. In this case, since it has been determined through lane determination process 514 that the host vehicle is traveling in the second lane (the second lane from the left), hatching 1114 is displayed in the second lane.

In addition, with respect to indicator 1103 and indicator 1113, displaying/not displaying is alternated between based on a recognition result by the division line recognition means 2 or a computation result of the third path computation means 9. Specifically, display of the indicator is terminated if a division line has not been recognized by the division line recognition means 2 for a predetermined period of time or longer (e.g., five seconds or longer), or if a division line (a boundary between lanes) has been traveled over for a predetermined period of time or longer (e.g., five seconds or longer). With respect to the former, display of the indicator is terminated because when a division line cannot be recognized by the division line recognition means 2, the third path ends up being continuously computed based solely on autonomous navigation, and errors in autonomous navigation become magnified. With respect to the latter, display of the indicator is terminated because when a division line (a boundary between lanes) is traveled over, there is a strong chance that the lane position would hunt left and right.

It is noted that, with respect to indicator 1103 and indicator 1113, instead of displaying the lane the host vehicle is currently traveling in by means of car mark 1104 for the host vehicle or by means of hatching 1114, there may be adopted a scheme in which the lane that is most suitable in passing through a fork, intersection, etc., ahead is notified to the passengers by a blinking display, etc., of car mark 1104 for the host vehicle or of hatching 1114 based on route guidance by navigation. For example, assuming that a highway with three lanes in each direction is being traveled, that there is a road ahead that forks left, and that route guidance by navigation also forks left, the first lane (the leftmost lane) in indicator 1113 is blink displayed with hatching 1114. As the passengers are consequently able to know in advance a suitable lane for traveling in, they feel better at ease.

In addition, in order to achieve the above, it is preferable that, in starting navigation route guidance, a guidance route including appropriate lane positions be created in advance. Further, it is preferable that a guidance route including lane positions be created in correspondence with traffic congestions and lane closures due to construction work by obtaining traffic information from VICS (Vehicle Information and Communication System), etc.

As described above, by notifying information to passengers using a screen, it is possible to put them at better ease and improve comfort.

Thus, various embodiments are possible within a scope that does not depart from the spirit of the present invention.

Thus, since a division line provided on a road with a plurality of lanes in each direction is detected, and the lane a host vehicle is traveling in is determined based on a travel path of the host vehicle computed based on the relationship between this division line and the host vehicle and on autonomous navigation that takes road geometry into account, it is possible to make the distance that needs to be traveled before the lane traveled can be determined shorter than in the method of Patent Document 2, and it is possible to reduce errors that accumulate in proportion to the distance traveled. Further, even when a division line is undetectable, by interpolating the travel path of the host vehicle through autonomous navigation that takes road geometry into account, it becomes possible to determine lanes in cases where lanes are changed on curved roads such as curves, etc., which could not be achieved with the method of Patent Document 3. Accordingly, since accurate lane determination is possible, advanced route guidance by a navigation system becomes possible.

The invention claimed is:

1. A lane determining device that determines a lane traveled by a host vehicle traveling on a road with a plurality of lanes in each direction, the lane determining device comprising:

imaging means that images the road:

road geometry obtaining means that obtains a road geometry ahead of where the host vehicle is traveling:

division line recognition means that recognizes a division line from an image imaged by the imaging means;

first path computation means that computes a path of the host vehicle by repeatedly computing a distance from the division line recognized by the division line recognition means to the imaging means:

second path computation means that computes a path of the host vehicle based on autonomous navigation;

third path computation means that computes a path of the host vehicle based on a first path computed by the first path computation means and on a second path computed by the second path computation means:

traveled lane determination means that determines the lane traveled by the host vehicle based on a third path computed by the third path computation means:

travel direction estimation means that estimates a travel direction of the host vehicle based on the first path computed by the first path computation means:

initialization means that initializes at least one of a heading and a position of the autonomous navigation based on the travel direction of the host vehicle estimated by the travel direction estimation means and on the first path; and information notification means that notifies information to a passenger using a screen or audio, wherein the third path computation means computes the third path based on the first path if the division line recognition means was able to recognize a division line, and computes the third path based on the second path if the division line recognition means was unable to recognize a division line, the third path computation means comprising vehicle speed detection means that detects a speed of the host vehicle, and heading detection means that detects a heading of the host vehicle, the autonomous navigation computes a path of the host vehicle based on the vehicle speed detected by the vehicle speed detection means and on the heading detected by the heading detection means, the initialization means takes the first path computed by the first path computation means as an initial value for a path of the autonomous navigation if a difference between the travel direction of the host vehicle estimated by the travel direction estimation means and a direction of the division line recognized by the division line recognition means is within a predetermined angle, or if a change in the difference between the directions is less than a predetermined value over a predetermined period or travel distance, based on a kind of the division line recognized by the division line recognition means, the traveled lane determination means determines the lane traveled by the host vehicle and corrects the third path computed by the third path computation means, the information notification means changes a content of the information to be notified to the passenger based on the lane traveled by the host vehicle determined by the traveled lane determination means, and the second path computation means computes a path of the host vehicle based on the road geometry obtained by the road geometry obtaining means and on the autonomous navigation.

2. A lane determining device according to claim 1, wherein the road geometry obtained by the road geometry obtaining means comprises information including at least radius of curvature and number of lanes of the road.

3. A lane determining device according to claim 2, wherein the second path computation means and the third path computation means define one of division lines provided on the road with the plurality of lanes in each direction as a reference division line, and compute a path of the host vehicle by repeatedly computing a distance from the reference division line.

4. A lane determining device according to claim 3, wherein the traveled lane determination means determines the lane traveled by the host vehicle based on the distance from the reference division line with respect to the third path computed by the third path computation means, the number of lanes, and lane width.

5. A lane determining device according to claim 4, wherein, if the road traveled by the host vehicle is a curved road, the second path computation means simulationally deems the curved road a collection of continuous straight roads, finds a distance to a division line with respect to each deemed straight road while converting coordinates, and computes a path of the host vehicle.

6. A lane determining device according to claim 5, wherein, when the division line recognition means becomes unable to recognize a division line, the initialization means initializes the heading and the position of the autonomous navigation based on the travel direction of the host vehicle estimated by the travel direction estimation means and on the distance from the reference division line with respect to the third path computed by the third path computation means.

7. A lane determining device according to claim 6, wherein the information notification means notifies, using the screen, which lane on the road with the plurality of lanes in each direction is being traveled based on the lane traveled by the host vehicle determined by the traveled lane determination means, and stops notification through the screen if the division line recognition means has been unable to recognize a division line for a predetermined period of time or longer or if the host vehicles travels over the division line for a predetermined period of time or longer.

8. A navigation system comprising the lane determining device according to claim 1.

9. A navigation system comprising the lane determining device according to claim 2.

10. A navigation system comprising the lane determining device according to claim 3.

11. A navigation system comprising the lane determining device according to claim 4.

12. A navigation system comprising the lane determining device according to claim 5.

13. A navigation system comprising the lane determining device according to claim 6.

14. A navigation system comprising the lane determining device according to claim 7.

* * * * *